US010679407B2

(12) United States Patent
Schissler et al.

(10) Patent No.: US 10,679,407 B2
(45) Date of Patent: *Jun. 9, 2020

(54) METHODS, SYSTEMS, AND COMPUTER READABLE MEDIA FOR MODELING INTERACTIVE DIFFUSE REFLECTIONS AND HIGHER-ORDER DIFFRACTION IN VIRTUAL ENVIRONMENT SCENES

(71) Applicant: The University of North Carolina at Chapel Hill, Chapel Hill, NC (US)

(72) Inventors: Carl Henry Schissler, Carrboro, NC (US); Ravish Mehra, Chapel Hill, NC (US); Dinesh Manocha, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,155

(22) Filed: Jun. 29, 2015

(65) Prior Publication Data

US 2015/0378019 A1 Dec. 31, 2015

Related U.S. Application Data

(60) Provisional application No. 62/018,329, filed on Jun. 27, 2014.

(51) Int. Cl.
*G06F 17/00* (2019.01)
*G06T 17/20* (2006.01)
(Continued)

(52) U.S. Cl.
CPC .............. *G06T 17/20* (2013.01); *G06T 15/06* (2013.01); *H04S 7/30* (2013.01)

(58) Field of Classification Search
CPC ............ G06T 15/06; G06T 17/20; H04S 7/30
(Continued)

(56) References Cited

U.S. PATENT DOCUMENTS 4,908,837 A 3/1990 Mori et al.
5,467,401 A 11/1995 Nagamitsu et al.
(Continued)

FOREIGN PATENT DOCUMENTS

WO WO 2013/184215 A2 12/2013

OTHER PUBLICATIONS

Mehra; Wave-Based Sound Propagation in Large Open Scenes Using an Equivalent Source Formulation (Year: 2013).*
(Continued)

*Primary Examiner* — Paul C McCord
(74) *Attorney, Agent, or Firm* — Jenkins, Wilson, Taylor & Hunt, P.A.

(57) ABSTRACT

Methods, systems, and computer readable media for simulating sound propagation are disclosed. According to one method, the method includes decomposing a virtual environment scene including at least one object into a plurality of surface regions, wherein each of the surface regions includes a plurality of surface patches. The method further includes organizing sound rays generated by a sound source in the virtual environment scene into a plurality of path tracing groups, wherein each of the path tracing groups comprises a group of the rays that traverses a sequence of surface patches. The method also includes determining, for each of the path tracing groups, a sound intensity by combining a sound intensity computed for a current time with one or more previously computed sound intensities respectively associated with previous times and generating a simulated output sound at a listener position using the determined sound intensities.

27 Claims, 6 Drawing Sheets

(51) Int. Cl.
*G06T 15/06* (2011.01)
*H04S 7/00* (2006.01)
(58) Field of Classification Search
USPC .......................................................... 700/94
See application file for complete search history.

(56) References Cited

U.S. PATENT DOCUMENTS

| | | | |
|---|---|---|---|
| 5,771,041 A | 6/1998 | Small | |
| 6,259,452 B1 | 7/2001 | Coorg et al. | |
| 6,751,322 B1 | 6/2004 | Carlbom et al. | |
| 7,027,600 B1 | 4/2006 | Kaji et al. | |
| 7,289,633 B2 | 10/2007 | Metcalf | |
| 7,319,760 B2 | 1/2008 | Sekine et al. | |
| 7,394,904 B2 | 7/2008 | Bruno et al. | |
| 7,463,740 B2 * | 12/2008 | Kushida | G10K 15/12 381/17 |
| 7,480,386 B2 | 1/2009 | Ogata | |
| 7,809,453 B2 | 10/2010 | Reichelt et al. | |
| 7,930,048 B2 | 4/2011 | Reichelt et al. | |
| 8,029,363 B2 | 10/2011 | Radek et al. | |
| 8,133,117 B2 | 3/2012 | Ueda et al. | |
| 8,214,179 B2 | 7/2012 | Carlbom et al. | |
| 8,249,283 B2 | 8/2012 | Ando et al. | |
| 8,466,363 B2 | 6/2013 | Tsuchida | |
| 8,615,090 B2 | 12/2013 | Son et al. | |
| 8,634,578 B2 * | 1/2014 | Vickers | H03G 9/025 381/104 |
| 8,847,965 B2 * | 9/2014 | Chandak | G06F 17/5009 345/473 |
| 8,958,567 B2 * | 2/2015 | Tsingos | G10L 21/0202 381/310 |
| 8,995,675 B2 | 3/2015 | Chandak et al. | |
| 9,113,280 B2 | 8/2015 | Cho et al. | |
| 9,189,915 B2 | 11/2015 | Timperley | |
| 9,401,684 B2 | 7/2016 | Ren et al. | |
| 9,510,125 B2 * | 11/2016 | Raghuvanshi | H04S 7/30 |
| 9,711,126 B2 | 7/2017 | Mehra et al. | |
| 9,977,644 B2 | 5/2018 | Schissler et al. | |
| 10,248,744 B2 | 4/2019 | Schissler et al. | |
| 2001/0043738 A1 * | 11/2001 | Sawhney | G01S 5/163 382/154 |
| 2003/0052875 A1 * | 3/2003 | Salomie | G06T 17/20 345/419 |
| 2005/0281410 A1 | 12/2005 | Grosvenor et al. | |
| 2006/0116781 A1 * | 6/2006 | Blesser | H04R 5/04 700/94 |
| 2006/0126878 A1 | 6/2006 | Takumai et al. | |
| 2006/0247918 A1 | 11/2006 | Schmidt et al. | |
| 2006/0290695 A1 * | 12/2006 | Salomie | G06T 17/20 345/420 |
| 2007/0036432 A1 | 2/2007 | Xu et al. | |
| 2008/0037796 A1 | 2/2008 | Jot et al. | |
| 2008/0232602 A1 | 9/2008 | Shearer | |
| 2008/0240448 A1 | 10/2008 | Gustafsson et al. | |
| 2008/0249750 A1 | 10/2008 | Mao | |
| 2009/0046864 A1 | 2/2009 | Mahabub et al. | |
| 2009/0262604 A1 | 10/2009 | Funada | |
| 2010/0142733 A1 | 6/2010 | Choi et al. | |
| 2010/0208905 A1 | 8/2010 | Franck et al. | |
| 2011/0017545 A1 | 1/2011 | Pompei | |
| 2011/0081023 A1 | 4/2011 | Raghuvanshi et al. | |
| 2011/0222372 A1 | 9/2011 | O'Donovan et al. | |
| 2011/0249825 A1 | 10/2011 | Ise | |
| 2012/0007940 A1 | 1/2012 | Michrowski et al. | |
| 2012/0014525 A1 | 1/2012 | Ko et al. | |
| 2012/0016640 A1 | 1/2012 | Murphy | |
| 2012/0101609 A1 | 4/2012 | Supper et al. | |
| 2012/0249556 A1 | 10/2012 | Chandak et al. | |
| 2012/0269355 A1 | 10/2012 | Chandak et al. | |
| 2012/0288114 A1 | 11/2012 | Duraiswami et al. | |
| 2012/0307880 A1 | 12/2012 | Horbach et al. | |
| 2013/0002672 A1 * | 1/2013 | Peterson | G06T 15/06 345/426 |
| 2013/0207976 A1 | 8/2013 | Jenkins | |
| 2013/0236040 A1 | 9/2013 | Crawford et al. | |
| 2013/0272548 A1 | 10/2013 | Visser et al. | |
| 2013/0282388 A1 | 10/2013 | Engdegard | |
| 2014/0025386 A1 * | 1/2014 | Xiang | G10L 19/00 704/500 |
| 2014/0161268 A1 * | 6/2014 | Antani | H04S 7/305 381/63 |
| 2015/0057083 A1 | 2/2015 | Mehra et al. | |
| 2015/0294041 A1 | 10/2015 | Yeh et al. | |
| 2015/0332680 A1 | 11/2015 | Crockett et al. | |
| 2016/0034248 A1 | 2/2016 | Schissler et al. | |
| 2018/0121580 A1 | 5/2018 | Tsang et al. | |
| 2018/0232471 A1 | 8/2018 | Schissler et al. | |

OTHER PUBLICATIONS

Schissler: GSOUND: Interactive Sound Propagation for Games (Year: 2011).*

Notice of Allowance and Fee(s) Due for U.S. Appl. No. 13/373,901 (dated May 28, 2014).

Final Office Action for U.S. Appl. No. 13/373,901 (dated Jan. 14, 2014).

Non-Final Office Action for U.S. Appl. No. 13/373,901 (dated Sep. 11, 2013).

Abramowitz et al, "Handbook of Mathematical Functions," 5th ed. Dover, New York (1964).

Akenine-Moller et al., "Conservative and Tiled Rasterization Using a Modified Triangle Setup," Journal of Graphics Tools, vol. 10, No. 3, pp. 1-7 (2005).

Alarcao, et al., "An auralization system for real time room acoustics simulation," Proceedings of Tecniacustica, (2009).

Allen, et al., "Image method for efficiently simulating small-room acoustics," The Journal of the Acoustical Society of America, vol. 65, Issue 4 (April), pp. 943-950, (1979).

Antani, et al., "Aural proxies and directionally-varying reverberation for interactive sound propagation in virtual environments," Visualization and Computer Graphics, IEEE Transactions, vol. 19, Issue 4, pp. 218-233, (2013).

Antani, et al., "Efficient finite-edge diffraction using conservative from-region visibility," Applied Acoustics, vol. 73, pp. 218-233, (2012).

Antani et al., "Direct-to-Indirect Acoustic Radiance Transfer," IEEE Transactions on Visualization and Computer Graphics, vol. 18, No. 2, pp. 261-269 (Feb. 2012).

Antani et al., "Interactive Sound Propagation Using Compact Acoustic Transfer Operators," ACM Transactions on Graphics, vol. 31, No. 1, Article 7, pp. 7:1-7:12 (Jan. 2012).

Antonacci et al., "Fast Modeling of Acoustic Reflections and Diffraction in Complex Environments Using Visibility Diagrams," Proceedings of 12th European Signal Processing Conference, pp. 1773-1776 (2004).

Attenborough, et al., "Predicting Outdoor Sound," Taylor and Francis, New York, (2007).

Aretz, "Combined Wave and Ray Based Room Acoustic Simulations of Small Rooms: Challenges and limitations on the way to realistic simulation results," Ph.D. Thesis, Aachener Beiträge zur Technischen Akustik (Sep. 2012).

Arfken, George B. and Weber, Hans J., "Essential Mathematical Methods for Physicists," (1985).

Arvo et al., "A Survey of Ray Tracing Acceleration Techniques," An Introduction to Ray Tracing, pp. 201-262 (1989).

Barbone et al., "Scattering by a hybrid asymptotic/finite element method," Computer Methods in Applied Mechanics and Engineering, vol. 164, No. 1, pp. 141-156 (1998).

Battenberg et al., "Implementing Real-Time Partitioned Convolution Algorithms on Conventional Operating Systems," Proceedings of the 14th International Conference on Digital Audio Effects, Paris, France (2011).

Begault, "3-D Sound for Virtual Reality and Multimedia," NASA/TM-2000-000000, pp. 1-246 (Apr. 2000).

(56) References Cited

OTHER PUBLICATIONS

Bem-Artzi et al., "A Precomputed Polynomial Representation for Interactive BRDF Editing with Global Illumination," ACM Transactions on Graphics, pp. 1-10 (2008).
Bertram, et al., "Phonon tracing for auralization and visualization of sound," Proceedings of IEEE Visualization, pp. 151-158, (2005).
Biot et al., "Formulation of Wave Propagation in Infinite Media by Normal Coordinates with an Application to Diffraction," The Journal of the Acoustical Society of America, vol. 29, No. 3, pp. 381-391 (Mar. 1957).
Bittner et al., "Adaptive Global Visibilty Sampling," SIGGRAPH '09: ACM SIGGRAPH, pp. 1-10 (2009).
Bittner et al., "Fast Exact From-Region Visibility in Urban Scenes," Eurographics Symposium on Rendering, pp. 1-9 (2005).
Bittner et al., "Hierarchical Visibility Culling with Occlusion Trees," Proceedings of Computer Graphics International, pp. 207-219 (Jun. 1998).
Bittner et al., "Visibility in Computer Graphics," Environment and Planning B: Planning and Design, vol. 30, pp. 729-756 (2003).
Blauert, "Spatial Hearing: The Psychophysics of Human Sound Localization," MIT Press, pp. 334-335 (1983).
Borish, J., "Extension to the image model to arbitrary poly-hedra," The Journal of the Acoustical Society of America, vol. 75, Issue 6 (June), pp. 1827-1836, (1984).
Botteldooren, D. 1994. Acoustical finite-difference time-domain simulation in a quasi-Cartesian grid. The Journal of the Acoustical Society of America 95, 2313.
Calamia et al., "Diffraction culling for virtual-acoustic simulations," The Journal of the Acoustical Society of America. pp. 2586-2586 (2009).
Calamia et al., "Edge Subdivision for Fast Diffraction Calculations," 2005 IEEE Workshop on Applications of Signal Processing to Audio and Acoustics, pp. 187-190 (2005).
Calamia et al., "Fast Time-Domain Edge-Diffraction Calculations for Interactive Acoustic Simulations," EURASIP Journal on Advances in Signal Processing, vol. 2007, Article 63560, pp. 1-33 (2007).
Calamia et al., "Integration of edge diffraction calculations and geometrical-acoustics modeling," Proceedings of Forum Acusticum, pp. 1-6 (2005).
Case, K, "Structural Acoustics: a General Form of Reciprocity Principles in Acoustics," Technology Reports, JSR-92-193, The MITRE Corporation (Jan. 1993).
Chambers et al., "Time-domain experiments on the diffraction of sound by a step discontinuity," Journal of the Acoustical Society of America, vol. 96, No. 3, pp. 1887-1892 (Sep. 1994).
Chandak et al., "AD-Frustum: Adaptive Frustum Tracing for Interactive Sound Propagation," IEEE Transactions on Visualization and Computer Graphics, vol. 14, No. 6, pp. 1707-1714 (Nov./Dec. 2008).
Chandak, et al., "FastV: From-point visibility culling on complex models," Computer Graphics Forum (Proc. of EGSR), vol. 28, Issue 3, pp. 1237-1247, (2009).
Cheng et al., "Heritage and Early History of the Boundary Element Method," Engineering Analysis with Boundary Elements, vol. 29, No. 3, pp. 268-302 (Mar. 2005).
Shhugani et al., "vLOD: High-Fidelity Walkthrough of Large Virtual Environments," IEEE Transactions on Visualization and Computer Graphics, vol. 11, No. 1, pp. 35-47 (Jan./Feb. 2005).
Christensen et al., Odeon Manual, Chapter 6 (2013).
Christensen et al., "A New Scattering Method that Combines Roughness and Diffraction Effects," Forum Acousticum, Budapest, Hungary (2005).
Christensen et al., "Danish Acoustical Society Round Robin on Room Acoustic Computer Modeling," Odeon A/S: Lyngby, Denmark (2008).
Cohen-Or et al., "A Survey of Visibility for Walkthrough Applications," IEEE Transactions on Visualization and Computer Graphics, vol. 9, No. 3, pp. 412-431 (Jul.-Sep. 2003).

Coorg et al., "Real-Time Occlusion Culling for Models with Large Occluders," Symposium on Interactive 3D Graphics, pp. 83-90 (Apr. 1997).
Dalenback, "Room acoustic prediction based on a unified tretment of diffuse and specular reflection," The Journal of the Acoustical Society of America, vol. 100, No. 2, Pt. 1, pp. 899-909 (Aug. 1996).
Dalenbäck et al., "A Macroscopic View of Diffuse Reflection," J. Audio Eng. Soc., vol. 42, No. 10, pp. 793-807 (Oct. 1994).
Doicu et al, "Acoustic and Electromagnetic Scattering Analysis Using Discrete Sources," 1st ed. Academic Press (Jul. 2000).
Dross, et al., "A fast reverberation estimator for virtual environments," Audio Engineering Society Conference: 30th.
Duguet et al., "Robust Epsilon Visibility," Proc. of ACM SIGGRAPH, pp. 567-575 (2002).
Durand et al., "Conservative Visibility Preprocessing Using Extended Projections," SIGGRAPH '00: Proceedings of the 27th Annual Conference on Computer Graphics and Interactive Techniques, pp. 1-13 (2000).
Durand, "3D Visibility: Analytical Study and Applications," pp. 1-305 (1999).
Durand et al., "The 3d visibility complex: a new approach to the problems of accurate visibility," Proceedings of the Eurographics Workshop on Rendering Techniques '96, pp. 245-256 (1996).
Durand et al., "The Visibility Skeleton: A Powerful and Efficient Multi-Purpose Global Visibility Tool," SIGGRAPH '97: Proceedings of the 24th Annual Conference on Computer Graphics and Interactive Techniques, pp. 89-100 (1997).
Economou, et al., "The significance of sound diffraction effects in predicting acoustics in ancient theatres," Acta Acustica united with Acustica, vol. 99, Issue 1, pp. 48-57, (2013).
Embrechts, et al., "Broad spectrum diffusion model for room acoustics ray-tracing algorithms," The Journal of the Acoustical Society of America, vol. 107, Issue 4, pp. 2068-2081, (2000).
Eyring, C. F, "Reverberation time in "dead" rooms," The Journal of the Acoustical Society of America, vol. 1, Issue 2A (January), pp. 217-241, (1930).
Fairweather et al., "The Method of Fundamental Solutions for Scattering and Radiation Problems," Engineering Analysis with Boundary Elements, vol. 27, No. 7, pp. 759-769 (Jul. 2003).
Fouad et al., "Perceptually Based Scheduling Algorithms for Real-Time Synthesis of Complex Sonic Environments," Proceedings of International Conference on Auditory Display (1997).
Franzoni, et al., "An acoustic boundary element method based on energy and intensity variables for prediction of high-frequency broadband sound fields," The Journal of the Acoustical Society of America, vol. 110, Article 3071, (2001).
Funkhouser, et al., "A beam tracing approach to acoustic modeling for interactive virtual environments," Proceedings of ACM SIGGRAPH, pp. 21-32, (1998).
Funkhouser et al., "Survey of Methods for Modeling Sound Propagation in Interactive Virtual Environment Systems," Presence, pp. 1-53 (2004).
Funkhouser et al., "A beam tracing method for interactive architectural acoustics," Journal of Acoustical Society of America, vol. 115, No. 2, pp. 739-756 (Feb. 2004).
Gallo et al., "Efficient 3D Audio Processing on the GPU," ACM Workshop on General Purpose Computing on Graphics Processors (2004).
Garland, et al., "Surface simplification using quadric error metrics," Proceedings of the 24th annual conference on Computer graphics and interactive techniques, ACM Press/Addison-Wesley Publishing Company, pp. 209-216, (1997).
Geringer et al., "High School String Players Perception of Violin, Trumpet, and Voice Intonation," String Research Journal, vol. 3, pp. 81-96 (2012).
Ghali, "A Survey of Practical Object Space Visibility Algorithms," SIGGRAPH, pp. 1-14 (2001).
Gigus et al., "Efficiently Computing and Representing Aspect Graphs of Polyhedral Objects," IEEE Transactions on Pattern Analysis Machine Intelligence, vol. 13, No. 6, pp. 542-551 (Jun. 1991).

(56) References Cited

OTHER PUBLICATIONS

Granier, E., Kleiner, M., Dalnbck, B.-I., and Svensson, P. 1996. Experimental auralization of car audio installations. Journal of the Audio Engineering Society 44, 10, 835-849.
Griesinger, David, "The Importance of the Direct to Reverberant Ratio in the Perception of Distance, Localization, Clarity, and Envelopment," Audio Engineering Society Convention, vol. 126, Audio Engineering Society (2009).
Gumerov et al., "Fast multipole methods for the Helmholtz equation in three dimensions." Elsevier Science. (2004).
Gumerov et al., "A Broadband Fast Multipole Accelerated Boundary Element Method for the 3D Helmholtz Equation," The Journal of the Acoustical Society of America, vol. 125, No. 1, pp. 1-46 (2008).
Hampel et al., "Coupling boundary elements to a raytracing procedure," International Journal for Numerical Methods in Engineering, vol. 73, No. 3, pp. 427-445 (2008).
Hasenfratz et al., "A Survey of Real-Time Soft Shadows Algorithms," Eurographics, vol. 22, No. 4, pp. 753-774 (2003).
Heckbert et al., "Beam Tracing Polygonal Objects," Proc. of ACM SIGGRAPH, pp. 1-23 (1984).
Herder, Jens, "Optimization of Sound Spatialization Resource Management Through Clustering," The Journal of Three Dimensional Images, 3D-Forum Society, vol. 13, pp. 59-65 (1999).
Hobson, "The Theory of Spherical and Ellipsoidal Harmonics," Cambridge University Press, New York, NY, USA (1955).
Huang, et al., "An accurate method for voxelizing polygon meshes," Volume Visualization, 1998. IEEE Symposium on, IEEE, pp. 119-126, (1998).
Hudson et al., "Accelerated Occlusion Culling using Shadow Frusta," Proc. of ACM Symposium on Computational Geometry, pp. 1-10 (1997).
James, et al., "Precomputed acoustic transfer: output-sensitive, accurate sound generation for geometrically complex vibration sources," Proceedings of ACM SIGGRAPH, pp. 987-995, (2006).
Jean et al., "Calculation of Tyre Noise Radiation with a Mixed Approach," Acta Acustica united with Acustica, vol. 94, No. 1, pp. 1-6 (2008).
Kajiya, "The Rendering Equation," Proc. of ACM SIGGRAPH, vol. 20, No. 4, pp. 143-150 (1986).
Kapralos et al., "Sonel Mapping: Acoustic Modeling Utilizing an Acoustic Version of Photon Mapping," IEEE International Workshop on Haptics Audio Visual Environments and their Applications, pp. 2-3 (2004).
Klosowski et al., "The Prioritized-Layered Projection Algorithm for Visible Set Estimation," IEEE Transactions on Visualization and Computer Graphics, vol. 6, No. 2, pp. 108-123 (Apr.-Jun. 2000).
Koltun et al., "Hardware-accelerated from-region visibility using a dual ray space," Proceedings of the 12th Eurographics Workshop on Rendering Techniques, pp. 205-216 (2001).
Koltun et al., "Virtual Occluders: An Efficient Intermediate PVS Representation," Eurographics Workshop on Rendering, pp. 1-12 (2000).
Koltun et al., "Selecting Effective Occluders for Visibility Culling," Eurographics, pp. 1-5 (2000).
Kouyoumjian, et al., "A uniform geometrical theory of diffraction for an edge in a perfectly conducting surface," Proceedings of the IEEE, vol. 62, Issue 11, pp. 1448-1461, (1974).
Krivanek, et al., "Practical Global Illumination with Irradiance Caching," ACM SIGGRAPH Course Notes, (2008).
Krokstad, et al., "Calculating the acoustical room response by the use of a ray tracing technique," Journal of Sound and Vibration, vol. 8, Issue 1 (July), pp. 118-125, (1968).
Kropp et al, "Application of the Time Domain Firmulation of the Method of Equivalent Sources to Radiation and Scattering Problems," Acta Acustica united with Acustica, vol. 81, No. 6, pp. 528-543 (1995).
Kulp, Barry D., "Digital Equalization Using Fourier Transform Techniques," Audio Engineering Society Convention, vol. 85, Audio Engineering Society (1988).
Kuttruff, H, "Acoustics: An Introduction," Taylor and Francis, New York, (2007).
Kuttruff, H., "A simple iteration scheme for the computation of decay constants in enclosures with diffusely reflecting boundaries," The Journal of the Acoustical Society of America, vol. 98, Issue 1, pp. 288-293, (1995).
Laine et al., "Accelerated beam tracing algorithm," Applied Acoustics, No. 70, pp. 172-181 (2009).
Laine, "An Incremental Shaft Subdivision Algorithm for Computing Shadows and Visibility," Master's Thesis, Helsinki University of Technology (Mar. 29, 2006).
Lauterbach et al., "Adaptive sampling for frustum-based sound propagation in complex and dynamic environments," Proceedings of the 19th International Congress on Acoustics, pp. 1-6 (Sep. 2007).
Lauterbach et al., "Interactive Sound Rendering in Complex and Dynamic Scenes sing Frustum Tracing," IEEE Transactions on Visualization and Computer Graphics, vol. 13, No. 6, pp. 1672-1679 (Nov.-Dec. 2007).
Law et al., "Preprocessing Occlusion for Real-Time Selective Refinement," 1999 Symposium on Interactive 3D Graphics, pp. 47-53 (1999).
Lehnert, "Systematic Errors of the Ray-Tracing Algorithm," Applied Acoustics, vol. 38, pp. 207-221 (1993).
Lehtinen, "Time-domain Numerical Solution of the Wave Equation," pp. 1-17 (Feb. 6, 2003).
Lensch et al., "FastV: From-point Visibility Culling on Complex Models," Eurographics Symposium on Rendering, vol. 28, No. 4, pp. 1-8 (2009).
Lentz, et al., "Virtual reality system with integrated sound field simulation and reproduction," EURASIP Journal on Advances in Signal Processing 2007 (January), pp. 187-187, (2007).
Leyvand et al., "Ray Space Factorization for From-Region Visibility," ACM Transactions on Graphics, pp. 595-604 (Jul. 2003).
Liu et al, "Development of the Fast Multipole Boundary Element Method for Acoustic Wave Problems," Recent Advances in Boundary Element Methods, pp. 287-303 (2009).
Liu, "The PTSD Algorithm: A Time-Domain Method Combining the Pseudospectral Technique and Perfectly Matched Layers," The Journal of the Acoustical Society of America, vol. 101, No. 5, p. 3182 (1997).
Lloyd et al., "Warping and Partitioning for Low Error Shadow Maps," Proceedings of the Eurographics Symposium on Rendering, pp. 1-13 (2006).
Lokki et al., "Studies of Epidaurus with a Hybrid Room Acoustics Modelling Method," In the Acoustics of Ancient Theatres Conference, Greece, pp. 1-6 (Sep. 2011).
Lorensen, et al., "Marching cubes: A high resolution 3d surface construction algorithm," ACM Siggraph Computer Graphics, vol. 21, ACM, pp. 163-169, (1987).
Luebke et al., "Portals and Mirrors: Simple, Fast Evaluation of Potentially Visibile Sets," ACM Interactive 3D Graphics Conference, pp. 105-108 (1995).
Mattausch et al., "CHC++: Coherent Hierarchical Culling Revisited,"Proc. of Eurographics Workshop on Rendering, vol. 27, No. 3, pp. 221-230 (2008).
Medwin et al., "Impulse studies of double diffraction: A discrete Huygens interpretation," The Journal of the Acoustical Society of America, pp. 1005-1013 (Sep. 1982).
Mehra, et al., "Wave-based sound propagation in large open scenes using an equivalent source formulation," ACM Transactions on Graphics, vol. 32, Issue 2, pp. 19:1-19:13, (2013).
Moeck, et al., "Progressive perceptual audio rendering of complex scenes," Proceedings of Symposium on Interactive 3D graphics and games, ACM, pp. 189-196, (2007).
Müller-Tomfelde, Christian, "Time-Varying Filter in Non-Uniform Block Convolution," Proceedings of the COST G-6 Conference on Digital Audio Effects (2001).
Murphy et al., "Hybrid Room Impulse Response Synthesis in Digital Waveguide Mesh Based Room Acoustics Simulation," In Proceedings of the 11th International Conference on Digital Audio Effects (DAFx-08), pp. 1-8 (Sep. 2008).

(56) References Cited

OTHER PUBLICATIONS

Navazo et al., "ShieldTester: Cell-to-cell visibility test for surface occluders," Proc. of Eurographics, pp. 291-302 (2003).
Nirenstein et al., "Exact From-Region Visibility Culling," Thirteenth Eurographics Workshop on Rendering, pp. 191-202 (2002).
Nirenstein et al., "Hardware Accelerated Visibility Preprocessing using Adaptive Sampling," Eurographics Symposium on Rendering (2004).
Nirenstein, "Fast and Accurate Visibility Preprocessing," Dissertation, University of Cape Town, South Africa (2003).
Nironen, H, "Diffuse Reflections in Room Acoustics Modelling," PhD thesis, Helsinki University of Technology, (2004).
Nooruddin, el at., "Simplification and repair of polygonal models uing volumetric techniques," Visualization and Computer Graphics, IEEE Transactions, vol. 9, Issue 2, pp. 191-205, (2003).
Notification of Transmittal of the International Search Report and the Written Opinion of the International Searching Authority, or the Declaration for International Application No. PCT/US2013/031619 (dated Dec. 24, 2013).
"Nvidia occlusion query," http://oss.sgi.com/projects/ogl-sample/registry/NV/occlusion_query.txt (2002).
Ochmann, "The Full-Fled Equations for Acoustic Radiation and Scattering," The Journal of the Acoustical Society of America, vol. 105, No. 5, pp. 2574-2584 (1999).
Ochmann, M. 1995. The source simulation technique for acoustic radiation problems. Acta Acustica united with with Acustica 81, 6, 512-527.
Overbeck et al., "A Real-time Beam Tracer with Application to Exact Soft Shadows," Eurographics Symposium on Rendering, pp. 85-98 (Jun. 2007).
Owens et al., "A Survey of General-Purpose Computation on Graphics Hardware," Computer Graphics Forum, vol. 26, No. 1, pp. 80-113 (2007).
Pavic, "A Technique for the Computation of Sound Radiation by Vibrating Bodies Using Substitute Sources," Acta Acustica united with Acustica, vol. 92, pp. 112-126 (2006).
Pelzer, et al., "Frequency-and time-dependent geometry for real-time auralizations," Proceedings of 20th International Congress on Acoustics, ICA, (2010).
Pierce, "Acoustics: An Introduction to its Physical Principles and Applications," The Journal of the Acoustical Society of America, vol. 70(5), p. 1548 (1981).
Pulkki et al, "Implementation and visualization of edge diffraction with image source method," In Proceedings of the 112th AES Convention, pp. 1-13 (May 10-13, 2002).
Pulkki et al., "Visualization of edge diffraction," Acoustics Research Letters Online, vol. 4, No. 4, pp. 118-123 (2002).
Pulkki, Ville, "Virtual Sound Source Positioning using Vector Base Amplitude Panning," Journal of the Audio Engineering Society, vol. 45, Issue 6, pp. 456-466 (1997).
Raghuvanshi et al., "Accelerated Wave-Based Acoustics Simulation," SPM '08: Proceedings of the 2008 ACM Symposium on Solid and Physical Modeling, pp. 91-102 (2008).
Raghuvanshi et al., "Efficient and Accurate Sound Propagation Using Adaptive Rectangular Decomposition," IEEE Transactions on Visualization and Computer Graphics, vol. 15, No. 5, pp. 789-801 (2009).
Raghuvanshi, et al., "Precomputed wave simulation for real-time sound propagation of dynamic sources in complex scenes," ACM Transactions on Graphics, vol. 29, Issue 4, pp. 68:1-68:11, (2010).
Reshetov et al., "Multi-Level Ray Tracing Algorithm," ACM Trans. Graph., pp. 1176-1185 (2005).
Rindel, et al., "Room Acoustic Simulation and Auralization—How Close can we get to the Real Room?," Proceedings of 8th Western Pacific Acoustics Conference, Melbourne (2003).
Sakamoto et al, "Numerical Analysis of Sound Propagation in Rooms Using the Finite Difference Time Domain Method," The Journal of the Acousitcal Society of America, vol. 120, No. 5, p. 3008 (2006).
Savioja, et al., "Auralization Applying the Parametric Room Acoustic Modeling Technique—The Diva Auralization System," 8th International Conference on Auditory Display, pp. 219-224, (2002).
Savioja, L, "Real-Time 3D Finite-Difference Time-Domain Simulation of Mid-Frequency Room Acoustics," 13th International Conference on Digital Audio Effects, DAFx-10, (2010).
Schaufler et al., "Conservative Volumetric Visibility with Occluder Fusion," SIGGRAPH 2000, Computer Graphics Proceedings, pp. 229-238 (2000).
Schissler, et al., "Gsound: Interactive sound propagation for games," AES 41st International Conference: Audio for Games, (2011).
Schissler et al., "High-Order Diffraction and Diffuse Reflections for Interactive Sound Propagation in Large Environments," ACM Transactions on Graphics (SIGGRAPH 2014), vol. 33, Issue 4, Article 39 (2014).
Schröder, Dirk, "Physically Based Real-Time Auralization of Interactive Virtual Environments", vol. 11, Logos Verlag Berlin GmbH (2011).
Schroder et al., "Real-Time Hybrid Simulation Method Including Edge Diffraction," Proc. of the EAA Symposium on Auralization, pp. 1-6 (Jun. 15-17, 2009).
Schröder et al., "Real-Time Processing of Image Sources Using Binary Space Partitioning," Journal of the Audio Engineering Society, vol. 54, No. 7/8, pp. 604-619 (Jul./Aug. 2006).
Schroeder, M.R., "Natural sounding artificial reverberation," Journal of the Audio Engineering Society, vol. 10, Issue 3, pp. 19-223, (1962).
Shirley et al., "State of the Art in Interactive Ray Tracing," SIGGRAPH Course Notes (2006).
Shoemake, "Pluecker Coordinate Tutorial," Ray Tracing News 11 (1998).
Siltanen et al., "Frequency Domain Acoustic Radiance Transfer for Real-Time Auralization," Acta Acustica United with Acustica, vol. 95, pp. 106-117 (2009).
Siltanen, et al., "The Room Acoustic Rendering Equation," The Journal of the Acoustical Society of America, vol. 122, No. 3, pp. 1624-1635 (2007).
Siltanen, et al., "Geometry reduction in room acoustics modeling," Acta Acustica united with Acustica, vol. 94, Issue 3, pp. 410-418, (2008).
Southern, et al., "Spatial room impulse responses with a hybrid modeling method," Audio Engineering Society Convention 130 (2011).
Svensson et al., "Edge-Diffraction Impulse Responses Near Specular-Zone and Shadow-Zone Boundaries," Acta Acustica United with Acustica, vol. 92, pp. 501-512 (2006).
Svensson et al., "Computational Modelling and Simulation of Acoustic Spaces," AES 22nd International Conference on Virtual, Synthetic and Entertainment Audio, pp. 1-20 (2002).
Svensson, et al., "An analytic secondary source model of edge diffraction impulse responses," Acoustical Society of America Journal, vol. 106, Issue 5 (Nov.), pp. 2331-2344, (1999).
Svensson, "Edge Diffraction Toolbox," pp. 1-2 (1999).
Taflove et al, "Computational Electrodynamics: the Finite-Difference Time-Domain Method, Third Edition," 3rd ed. Artech House Publishers, London, UK and Boston, USA, ch. 1,4 (Jun. 2005).
Taylor, et al., "Guided multiview ray tracing for fast auralization," IEEE Transactions on Visualization and Computer Graphics, vol. 18, Issue 11 (November), pp. 1797-1810, (2012).
Taylor et al., "iSound: Interactive GPU-based Sound Auralization in Dynamic Scenes," Techincal Report TR 10-006, University of North Carolina at Chapel Hill, pp. 1-10 (2010).
Taylor et al., "Fast Edge-Diffraction for Sound Propagation in Complex Virtual Envirnoments," EAA Auralization Symposium, pp. 1-6 (Jun. 2009).
Taylor, et al., "Resound: interactive sound rendering for dynamics virtual environments," MM '09: Proceedings of the seventeen ACM international conference on Multimedia, ACM, pp. 271-280, (2009).
Teller et al., "Computing the Antipenumbra of an Area Light Source," SIGGRAPH '92: Proceedings of the 19th Annual Conference on Computer Graphics and Interactive Techniques, pp. 139-148 (1992).

(56) References Cited

OTHER PUBLICATIONS

Teller et al., "Visibility Preprocessing for Interactive Walk-throughs," SIGGRAPH Comput. Graph., pp. 61-70 (1991).
Teller, "Visibility Computations in Densely occluded Polyheral Environments," PhD thesis, CS Division, UC Berkeley (1992).
Theoharis et al., "The Magic of the Z-Buffer: A Survey," Proc. of 9th International Conference on Computer Graphics, Visualizationa and Computer Vision, WSCG (2001).
Thompson et al, "Acoustics," John Wiley & Sons, Ltd. (2004).
Thompson, L. L., "A review of finite-element methods for time-harmonic acoustics," Journal of the Acoustical Society of America, vol. 119, Issue 3 (Mar.), pp. 1315-1330, (2006).
Torres et al., "Computation of edge diffraction for more accurate room acoustics auralization," The Journal of the Acoustical Society of America, pp. 600-610 (2001).
Tsingos, et al., "Instant sound scattering," Proceedings of the Eurographics Symposium on Rendering, pp. 111-120, (2007).
Tsingos, et al., "Modeling acoustics in virtual environments using the uniform theory of diffraction," SIGGRAPH 2001, Computer Graphics Proceedings, pp. 545-552, (2001).
Tsingos, et al., "Perceptual audio rendering of complex virtual environments," Tech. Rep. RR-4734, INRIA, REVES/INRIA Sophia-Antipolis, Feb. 2003.
Tsingos, Nicholas, "A Versatile Software Architecture for Virtual Audio Simulations," International Conference on Auditory Display (ICAD) (2001).
Tsingos, et al., "Pre-computing geometry-based reverberation effects for games," 35th AES Conference on Audio for Games, pp. 1-10, (2009).
Tsingos et al., "A General Model for the Simulation of Room Acoustics Based on Hierarchical Radiosity," ACM SIGGRAPH 97, pp. 1-2 (1997).
Valimaki et al., "Fifty Years of Artificial Reverberation," IEEE Transactions on Audio, Speech, and Language Processing, vol. 20, Issue 5, pp. 1421-1448, (2012).
Vladimirov, V. S. 1976. Generalized functions in mathematical physics. Moscow Izdatel Nauka 1.
Vorlander, M, "Simulation of the transient and steady-state sound propagation in rooms using a new combined ray-tracing/image-source algorithm," The Journal of the Acoustical Society of America, vol. 86, Issue 1, pp. 172-178, (1989).
Wald et al., "State of the Art in Ray Tracing Dynamic Scenes," Eurographics State of the Art Reports, pp. 1-28 (2007).
Wand, M, et al., "Multi-resolution sound rendering," SPBG'04 Symposium on Point-Based Graphics 2004, pp. 3-11, (2004).
Wang et al., "A Hybrid Technique Based on Combining Ray Tracing and FDTD Methods for Site-Specific Modeling of Indoor Radio Wave Propagation," IEEE Transactions on Antennas and Propagation, vol. 48, No. 5, pp. 743-754 (May 2000).
Wang, et al., "Interactions of Model Detail Level and Scattering Coefficients in Room Acoustic Computer Simulation," International Symposium on Room Acoustics: Design and Science (2004).
Waterman, "T-matrix methods in acoustic scattering," The Journal of the Acoustical Society of America, vol. 125, No. 1, pp. 42-51 (Jan. 2009).
Wefers et al., "Efficient Time-Varying FIR Filtering using Crossfading Implemented in the DFT Domain," Forum Acousticum, Krakow, Poland, European Acoustics Association (2014).
Wenzel et al., "A Software-Based System for Interactive Spatial Sound Synthesis," ICAD, 6th International Conference on Auditory Display, pp. 151-156 (2000).
Wonka et al., "Guided Visibility Sampling," SIGGRAPH '06: ACM SIGGRAPH 2006 Papers, pp. 494-502 (2006).
Wonka et al., "Visibility Preprocessing with Occluder Fusion for Urban Walkthroughs," pp. 1-12 (2000).
Yee, "Numerical Solution of Initial Boundary Value Problems Involving Maxwell's Equations in Isotropic Media," IEEE Transactions on Antennas and Propagation, vol. 14, No. 3, pp. 302-307 (May 1966).
Yeh, et al., "Wave-ray coupling for interactive sound propagation in large complex scenes," ACM Transactions on Graphics, vol. 32, Issue 6, pp. 165:1-165:11, (2013).
Yin et al., "Generating 3D Builing Models from Architectural Drawings: A Survey," IEEE Computer Society, pp. 20-30 (Jan./Feb. 2009).
Yoon et al., Real-Time Massive Model Rendering, Morgan and Claypool Publishers (2008).
Zienkiewicz et al., "The Finite Element Method for Fluid Dynamics," 6 ed. Butterworth-Heinemann (Jan. 2006).
Non Final Office Action for U.S. Appl. No. 14/387,127 (dated Nov. 4, 2016).
Dross, et al., "A fast reverberation estimator for virtual environments," Audio Engineering Society 30th International Conference, pp. 99-108 (Mar. 2007).
Granier et al., "Experimental auralization of car audio installations," Journal of the Audio Engineering Society, vol. 44, No. 10, pp. 835-849 (Oct. 1996).
Ochmann, "The source simulation technique for acoustic radiation problems," Acta Acustica united with Acustica, vol. 81, No. 6, pp. 512-527 (1995).
Final Office Action for U.S. Appl. No. 14/329,251 (dated Aug. 29, 2017).
Non-Final Office Action for U.S. Appl. No. 15/435,243 (dated Jul. 19, 2017).
Cimpoi et al., "Deep filter banks for texture recognition and segmentation," pp. 1-9 (2015).
Non-Final Office Action for U.S. Appl. No. 14/812,785 (dated Apr. 13, 2017).
Non-Final Office Action for U.S. Appl. No. 14/329,251 (dated Mar. 14, 2017).
Notice of Allowance and Fee(s) Due for U.S. Appl. No. 14/387,127 (dated Mar. 13, 2017).
Applicant Initiated Interview Summary for U.S. Appl. No. 14/387,127 (dated Feb. 17, 2017).
Commonly-assigned, co-pending U.S. Appl. No. 15/435,243 for "Methods, Systems, and Computer Readable Media for Acoustic Classification and Optimization for Multi-Modal Rendering of Real-World Scenes," (Unpublished, filed Feb. 16, 2017).
Achanta et al., "SLIC Superpixels Compared to State-of-the-art Superpixel Methods," Journal of Latex Class Files, vol. 6, No. 1, pp. 1-8 (Dec. 2011).
Antani, Lakulish, "Acoustic Simulation," 55 pages, (Apr. 9, 2009).
Bao et al., "Understanding the 3d layout of a cluttered room from multiple images," in Applications of Computer Vision (WACV), 2014 IEEE Winter Conference on. IEEE, pp. 1-8 (2014).
Batlle et al., "Recent progress in coded structured light as a technique to solve the correspondence problem: a survey," Pattern recognition, vol. 31, No. 7, pp. 963-982, (1998).
Bell et al., "Material Recognition in the Wild with the Materials in Context Database," Computer Vision and Pattern Recognition (CVPR), pp. 3479-3487 (2015).
Branch et al., "Automatic hole-filling of triangular meshes using local radial basis function," in 3D Data Processing, Visualization, and Transmission, Third International Symposium on. IEEE, pp. 1-8 (2006).
Calamia et al., "Fast Time-Domain Edge-Diffraction Calculations for Interactive Acoustic Simulations," EURASIP Journal on Advances in Signal Processing, pp. 1-10 (Oct. 16, 2006).
Chen et al., "3D indoor scene modeling from rgb-d data: a survey," Computational Visual Media, vol. 1, No. 4, pp. 267-278, (2015).
Christensen et al., "Estimating absorption of materials to match room model against existing room using a genetic algorithm," in Forum Acusticum 2014, At Krakow, Poland, pp. 1-10 (2014).
Cimpoi et al., "Deep convolutional filter banks for texture recognition and segmentation," arXiv preprint arXiv:1411.6836, pp. 1-10 (2014).
Dou et al., "Exploring high-level plane primitives for indoor 3D reconstruction with a hand-held RGB-D camera," in Computer Vision-ACCV 2012 Workshops. Springer, pp. 94-108 (2013).
Foster, "Impulse response measurement using golay codes," in Acoustics, Speech, and Signal Processing, IEEE International Conference on ICASSP'86., vol. 11. IEEE, pp. 929-932 (1986).

(56) References Cited

OTHER PUBLICATIONS

Gumerov, et al., "A broadband fast multipole accelerated boundary element method for the three-dimensional Helmholtz equation," Journal of the Acoustical Society of America, vol. 125, Issue 1, pp. 191-205, (2009).
Härmä et al. "Augmented Reality Audio for Mobile and Wearable Appliances," Journal of the Audio Engineering Society, vol. 52, No. 6, pp. 618-639 (2004).
Hu et al., "Toward Robust Material Recognition for Everyday Objects." in BMVC, vol. 13, pp. 1-11 (2011).
ISO, "ISO 354, Acoustics—Measurement of sound absorption in a reverberation room." International Standards Organisation, 2nd Edition, No. 354, pp. 1-21 (2003).
Jia et al., "Caffe: Convolutional Architecture for Fast Feature Embedding," in Proceedings of the 22nd ACM International Conference on Multimedia, pp. 1-4 (2014).
Larsson et al., "Auditory-induced presence in mixed reality environments and related technology," in the Engineering of Mixed Reality Systems. Springer, pp. 1-23 (2010).
Liu et al., "Exploring features in a bayesian framework for material recognition," in Computer Vision and Pattern Recognition (CVPR), 2010 IEEE Conference, pp. 1-8 (2010).
Liu et al., "Rent3D: Floor-plan priors for monocular layout estimation," in Proceedings of the IEEE Conference on Computer Vision and Pattern Recognition, pp. 3413-3421 (2015).
Monks et al., "Audioptimization: Goal-Based Acoustic Design," Laboratory for Computer Science, Massachusetts Institute of Technology, 32 pages, (Sep. 1998).
Mückl et al., "Precomputing sound scattering for structured surfaces," in Proceedings of the 14th Eurographics Symposium on Parallel Graphics and Visualization, pp. 1-8 (2014).
Nava, "Inverse sound rendering: In-situ estimation of surface acoustic impedance for acoustic simulation and design of real indoor environments," Ph.D. dissertation, Graduate School of Information Science and Technology, University of Tokyo, pp. 1-111 (2007).
Newcombe et al., "KinectFusion: Real-time dense surface mapping and tracking," in Mixed and augmented reality (ISMAR), 2011 10th IEEE international symposium on. IEEE, pp. 1-10 (2011).
Pulkki, Spatial sound generation and perception by amplitud panning techniques. Helsinki University of Technology, Report 62, pp. 1-59 (2001).
Rindel et al., "Odeon, a design tool for noise control in indoor environments," in Proceedings of the International Conference Noise at work. Lille, pp. 1-9 (2007).
Saksela et al., "Optimization of absorption placement using geometrical acoustic models and least squares," The Journal of the Acoustical Society of America, vol. 137, No. 4, pp. EL274-EL280 (2015).
Savioja, et al., "Creating Interactive Virtual Acoustic Environments," Journal of the Audio Engineering Society (JAES), vol. 47, Issue 9, pp. 675-705 (1999).
Scharstein et al., "High-accuracy stereo depth maps using structured light," in IEEE Computer Vision and Pattern Recognition., vol. 1. IEEE, pp. 195-202 (2003).
Seddeq, "Factors influencing acoustic performance of sound absorptive materials," Australian Journal of Basic and Applied Sciences, vol. 3, No. 4, pp. 4610-4617 (2009).
Sormann et al., "Watertight multi-view reconstruction based on volumetric graph-cuts," in Image analysis. Springer, pp. 393-402 (2007).
Szegedy et al., "Going Deeper with Convolutions," in the IEEE Conference on Computer Vision and Pattern Recognition (CVPR), pp. 1-9 (Jun. 2015).
Tsingos et al., "Perceptual Audio Renderin gof Complex Virtual Environments,". ACM Transactions on Graphics, vol. 23, No. 3, pp. 249-258 (2004).
Wang et al., "A Hole-Filling Strategy for Reconstruction of Smooth Surfaces in Range Images," in XVI Brazilian Symposium on Computer Graphics and Image Processing, SIBGRAPI 2003, IEEE, pp. 1-9 (2003).
Advisory Action and AFCP 2.0 Decision for U.S. Appl. No. 14/329,251 (dated Nov. 16, 2017).
Notice of Allowance and Fee(s) Due for U.S. Appl. No. 14/812,785 (dated Oct. 30, 2017).
Advisory Action and AFCP Decision for U.S. Appl. No. 15/435,243 (dated Apr. 20, 2018).
Final Office Action for U.S. Appl. No. 15/435,243 (dated Jan. 26, 2018).
Non-Final Office Action for U.S. Appl. No. 14/329,251 (dated Jan. 26, 2018).
Applicant-Initiated Interview Summary for U.S. Appl. No. 14/329,251 (dated May 15, 2018).
Final Office Action for U.S. Appl. No. 14/329,251 (dated Jun. 6, 2018).
Non-Final Office Action for U.S. Appl. No. 14/329,251 (dated Nov. 14, 2018).
Notice of Allowance and Fee(s) Due for U.S. Appl. No. 15/435,243 (dated Nov. 9, 2018).
Advisory Action for U.S. Appl. No. 14/329,251 (dated Sep. 25, 2018).
Applicant-Initiated Interview Summary for U.S. Appl. No. 14/329,251 (dated Aug. 24, 2018).
Final Office Action for U.S. Appl. No. 14/329,251 (dated Apr. 16, 2019).
Applicant-Initiated Interview Summary for U.S. Appl. No. 14/329,251 (dated Mar. 1, 2019).
Notice of Panel Decision from Pre-Appeal Brieg Review for U.S. Appl. No. 14/329,251 (dated Aug. 14, 2019).

* cited by examiner

METHODS, SYSTEMS, AND COMPUTER READABLE MEDIA FOR MODELING INTERACTIVE DIFFUSE REFLECTIONS AND HIGHER-ORDER DIFFRACTION IN VIRTUAL ENVIRONMENT SCENES

PRIORITY CLAIM

This application claims the benefit of U.S. Provisional Patent Application Ser. No. 62/018,329, filed Jun. 27, 2014; the disclosure of which is incorporated herein by reference in its entirety.

GOVERNMENT INTEREST

This invention was made with government support under Grant Nos. W911 NF-10-1-0506, W911NF-12-1-0430, and W911 NF-13-C-0037 awarded by the Army Research Office. The government has certain rights in the invention.

TECHNICAL FIELD

The subject matter described herein relates to sound propagation. More specifically, the subject matter relates to methods, systems, and computer readable media for modeling interactive diffuse reflections and higher-order diffraction in virtual environment scenes.

BACKGROUND

Virtual environment technologies are widely used in different applications, including engineering design, training, architecture, and entertainment. In order to improve realism and immersion, it is important to augment visual perceptions with matching sound stimuli and auralize the sound fields. The resulting auditory information can significantly help the user evaluate the environment in terms of spaciousness and sound localization.

Currently, interactive sound propagation and rendering in large-scale virtual environments composed of multiple moving sources and objects can present many problems and difficulties with respect to generating an accurate representation. These include large urban environments spanning kilometers and made up of tens or hundreds of buildings with multiple moving vehicles. Other scenarios include large indoor environments such as auditoriums, offices, or factories with volumes up to tens or hundreds of thousands of cubic meters. The model complexity and large dimensions of these spaces result in many acoustic effects including reflections, scattering between the objects, high-order diffraction, late reverberation, echoes, etc.

The most accurate propagation algorithms for modeling various acoustic effects are based on numerically solving the acoustic wave equation. However, the complexity of these methods increases as a linear function of the surface area of the primitives or the volume of the acoustic space, and as at least a cubic function of the maximum simulated frequency. Recently, many wave-based precomputation techniques have been proposed for interactive applications [16, 38, 27, 23, 42]. However, current algorithms are limited to static scenes and the computational and memory requirements increase significantly for large virtual environments.

Some of the widely used techniques for interactive sound propagation are based on geometric acoustics (GA) and use computations based on ray theory. These are used to compute early reflections and diffractions in static scenes [12, 36, 4] or to precompute reverberation effects [39, 4]. A major challenge is to extend these techniques to complex virtual worlds with multiple moving objects or sources. In a large environment, surface scattering and edge diffraction components tend to overshadow specular reflections after a few orders of reflection [20]. Recent advances in ray tracing are used to develop fast sound propagation algorithms for dynamic scenes [21, 26, 34], but these methods still cannot compute compute high-order edge diffraction or diffuse reflections at interactive rates.

Accordingly, there exists a need for systems, methods, and computer readable media for modeling interactive diffuse reflections and higher-order diffraction in virtual environment scenes.

SUMMARY

Methods, systems, and computer readable media for modeling interactive diffuse reflections and higher-order diffraction in virtual environment scenes are disclosed. According to one method, the method includes decomposing a virtual environment scene including at least one object into a plurality of surface regions, wherein each of the surface regions includes a plurality of surface patches. The method further includes organizing sound rays generated by a sound source in the virtual environment scene into a plurality of path tracing groups, wherein each of the path tracing groups comprises a group of the rays that traverses a sequence of surface patches. The method also includes determining, for each of the path tracing groups, a sound intensity by combining a sound intensity computed for a current time with one or more previously computed sound intensities respectively associated with previous times and generating a simulated output sound at a listener position using the determined sound intensities.

A system for modeling interactive diffuse reflections and higher-order diffraction in virtual environment scenes is also disclosed. The system includes a processor and a sound propagation tracing (SPT) module executable by the processor. The SPT module is configured to decompose a virtual environment scene including at least one object into a plurality of surface regions, wherein each of the surface regions includes a plurality of surface patches and organize sound rays generated by a sound source in the virtual environment scene into a plurality of path tracing groups, wherein each of the path tracing groups comprises a group of the rays that traverses a sequence of surface patches. The SPT module is further configured to determine, for each of the path tracing groups, a sound intensity by combining a sound intensity computed for a current time with one or more previously computed sound intensities respectively associated with previous times. The SPT module is also configured to generate a simulated output sound at a listener position using the determined sound intensities.

The subject matter described herein can be implemented in software in combination with hardware and/or firmware. For example, the subject matter described herein can be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the terms "function" and "module" refer to software in combination with hardware and/or firmware for implementing features described herein.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for modeling interactive diffuse reflections and higher-order diffraction in large-scale virtual environment scenes are presented. In particular, the disclosed subject matter is based on ray-based sound propagation and is directly applicable to complex geometric datasets. Early reflections and diffractions are computed using geometric acoustics and late reverberation are computed using statistical techniques to automatically handle large dynamic scenes. In order to achieve interactive performance, new algorithms are utilized. In some embodiments, the subject matter includes an incremental approach that combines radiosity and path tracing techniques to iteratively compute diffuse reflections. Algorithms for wavelength-dependent simplification and visibility graph computation to accelerate higher-order diffraction at runtime are also described. Notably, the overall system can generate plausible sound effects at interactive rates in large, dynamic scenes that have multiple sound sources. As such, the disclosed subject matter improves the functioning and efficiency of the host machine executing these algorithms. Notably, the disclosed subject matter improves the technological field of acoustiscs and sound propagation, especially in the context of virtual scenes and environments.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
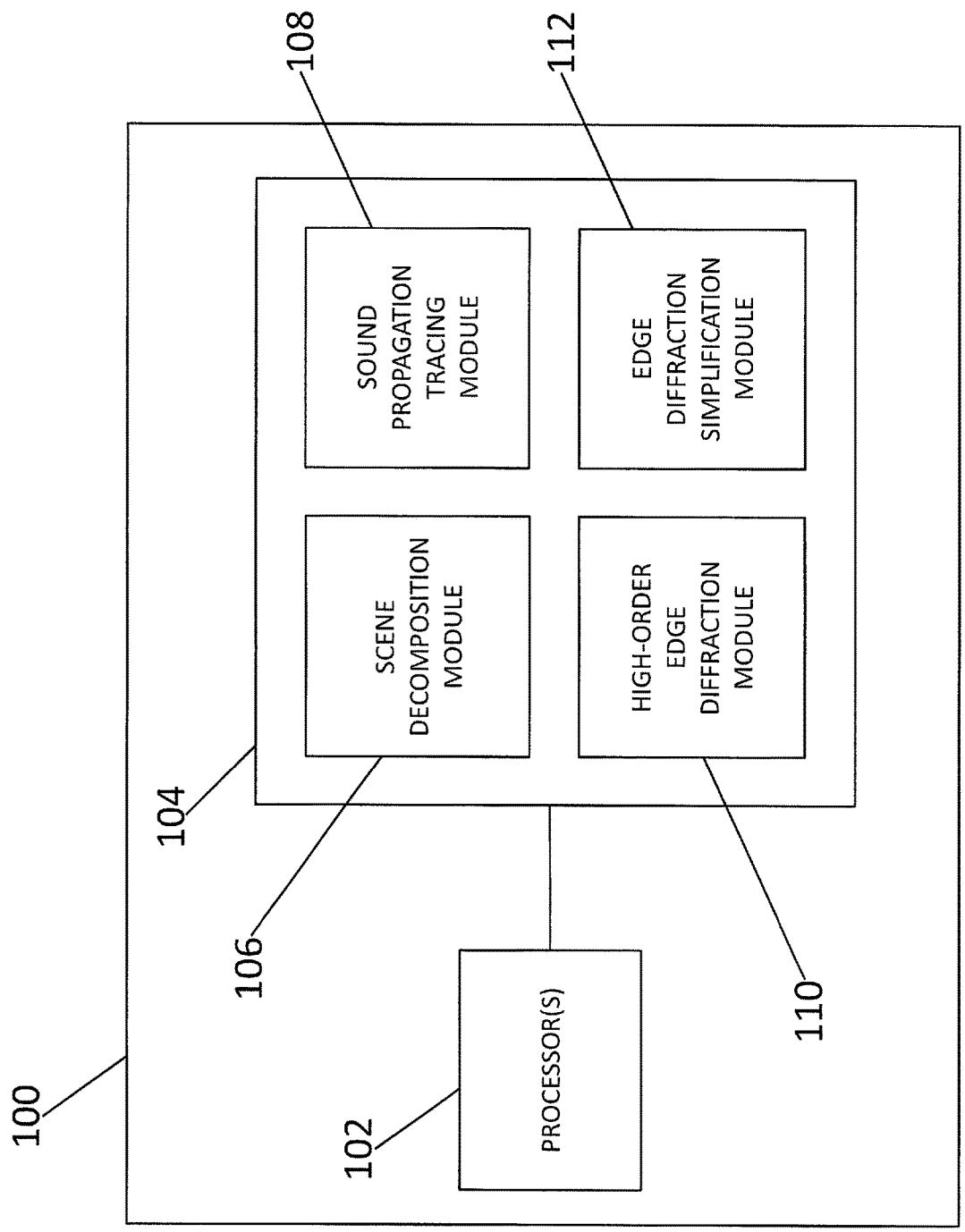
FIG. 1 is a diagram illustrating an exemplary node for modeling interactive diffuse reflections and higher-order diffraction in virtual environment scenes according to an embodiment of the subject matter described herein.

FIG. 1 is a block diagram illustrating an exemplary node 101 (e.g., a single or multiple processing core computing device) configured for simulating sound propagation according to an embodiment of the subject matter described herein. In some embodiments, node 101 may be a special purpose machine, computing device, and/or platform for performing one more aspects of the present subject matter described herein. In accordance with embodiments of the subject matter described herein, components, modules, and/or portions of node 101 may be implemented or distributed across multiple devices or computing platforms. For example, a cluster of nodes 101 may be used to perform various portions of a sound propagation technique or application.

In some embodiments, node 101 may comprise a computing platform that includes one or more processors 102. In some embodiments, processor 102 may include a physical processor, a central processing unit (CPU), a field-programmable gateway array (FPGA), an application-specific integrated circuit (ASIC)) and/or any other like processor core. Processor 102 may include or access memory 104, such as for storing executable instructions. Node 101 may also include memory 104. Memory 104 may be any non-transitory computer readable medium and may be operative to communicate with one or more of processors 102. Memory 104 may include a scene decomposition module (SDM) 106, a sound propagation tracing (SPT) module 108, a high-order edge diffraction (HED) module 110, and an edge diffraction simplification (EDS) module 112. In accordance with embodiments of the subject matter described herein, SDM 106 may be configured to cause processor(s) 102 to decompose a virtual environment scene that includes at least one object into a plurality of surface regions. In some embodiments, each of the surface regions includes a plurality of surface patches.

In some embodiments, SPT module 108 may be configured to use one or more techniques (e.g., geometric acoustic techniques) for simulating sound propagation in one or more environments. Geometric acoustic techniques typically solve the sound propagation problem by using assuming sound travels like rays. As such, geometric acoustic techniques may provide a good approximation of sound propagation when the sound wave travels in free space or when the interacting objects are large compared to the wavelength of sound. Therefore, these methods are more suitable for small wavelength (high frequency) sound waves, where the wave effect is not significant. However, for large wavelengths (low frequencies), it remains challenging to accurately model the diffraction and higher order wave effects.

Despite these limitations, geometric acoustic techniques are popular due to their computational efficiency, which enable them to handle very large scenes. Exemplary geometric acoustic techniques that may be used by SPT module 108 include methods based on stochastic ray tracing or image sources. In some embodiments, SPT module 108 may be configured to use one or more techniques (e.g., geometric acoustic techniques) for simulating sound propagation in one or more environments.

In accordance with embodiments of the subject matter described herein, SPT module 108 may be configured to organize sound rays (e.g., diffuse sound reflection rays) generated by a sound source in the virtual environment scene into a plurality of path tracing groups. Notably, each of the path tracing groups may include a group of the rays that traverses a sequence of surface patches. SPT module 108 may also be configured to determine, for each of the path tracing groups, a reflected sound intensity. For example, SPT module 108 may determine a sound intensity (e.g., a total reflected sound intensity) by combining and/or summing i) a sound intensity computed for a current time (e.g., a current time frame segment of an acoustic simulation duration) and ii) one or more previously computed sound intensities respectively associated with previously elapsed times (e.g., previously elapsed time frame segments). In some embodiments, SPT module 108 may also be configured to generate a simulated output sound at a listener position using the determined sound intensities. In some embodiments, SPT module 108 may also be configured to compute an output sound field associated with the virtual environment scene by combining all of the determined overall reflected sound intensities.

In some embodiments, SPT module 108 may be configured to preserve the phase information of the sound rays in each of the aforementioned path tracing groups. For example, SPT module 108 may determine, for each of the path tracing groups, a sound delay (e.g., an total sound delay) by combining a sound delay computed for the current time with one or more previously computed reflected sound delays respectively associated with the previously elapsed times. In some embodiments, the one or more previously computed reflected sound intensities and the one or more previously computed reflected sound delays may each comprise a moving average. In some embodiments, SPT module 108 may store the determined sound intensity for each of the path tracing groups within an entry of a hash table cache. In one embodiment, the hash table cache may be stored in memory 104. Notably, each entry of the hash table cache may be repeatedly and/or periodically updated by SPT module 108, e.g., for each time frame segment of a time period associated with an acoustic simulation duration.

In some embodiments, the disclosed subject matter utilizes SPT module 108 configured to employ an iterative approach that uses a combination of path tracing and radiosity techniques to compute diffuse reflections. Spatial and temporal coherence are exploited to reuse some of the rays traced during previous frames, such that an order of magnitude improvement over prior algorithms has been observed. Additional functionalities performed by SPT module 108 are described below in greater detail.

As indicated above, memory 104 may further include HED module 110. In some embodiments, HED module 110 may be configured to compute a preprocessed edge visibility graph (e.g., a diffraction edge visibility graph) for each edge of the at least one object included in the virtual environment scene generated by SDM 106.

Notably, the preprocessed edge visibility graph may be computed irrespective of the location of the sound source and the location of a listening entity. In some embodiments, at runtime, the graph is traversed and the higher-order edge diffraction contributions is computed by HED module 110 based on the uniform theory of diffraction. An exemplary diagram of a diffraction edge visibility graph may be found in FIG. 4 and described in greater detail below.

In some embodiments, memory 104 may also include EDS module 112, which may be configured to generate one or more meshes that correspond to different simulation wavelengths and reduce the number of diffraction edges of the at least one object in the virtual environment scene. In particular, EDS module 112 may be configured to facilitate a wavelength-dependent simplification scheme to significantly reduce the number of diffraction edges in a complex scene. For example, EDS module 112 may be configured to i) compute a surface voxelization for each of the one or more meshes, ii) simplify a shape of each of the one or more meshes by conducting a surface decimation operation to progressively merge vertices in the one or more meshes that share a diffraction edge into a single vertex, and iii) compute, for each of the one or more meshes, an edge visibility graph that includes a set of candidate diffraction edges from the simplified mesh, wherein the candidate diffraction edges significantly deviate from being planar. A diagram of the edge diffraction simplification process may be found in FIG. 6 and described in greater detail below.

In accordance with embodiments of the subject matter described herein, each of modules 106-110 may be configured to work in parallel with a plurality of processors (e.g., processors 102) and/or other nodes. For example, a plurality of processor cores may each be associated with a SPT module 108. Moreover, each processor core may perform processing associated with simulating sound propagation for a particular environment. In another embodiment, some nodes and/or processing cores may be utilized for precomputing (e.g., performing decomposition of a spatial domain or scene and generating transfer functions) and other nodes and/or processing cores may be utilized during run-time, e.g., to execute a sound propagation tracing application that utilizes precomputed values or functions.

In some embodiments, the execution and performance of modules 106-112 may be demonstrated in large urban scenes with tens of buildings, as well as complex indoor scenes corresponding to factories and offices with hundreds of obstacles. The performance scales with the number of cores, and interactive sound propagation and rendering can be performed at 15-50 frames per second using a 4-core CPU. The approach scales logarithmically with the model complexity of the scene and linearly with the number of moving sources and objects. Notably, the disclosed subject matter can generate plausible acoustic effects for large and complex virtual environments at interactive rates.

It will be appreciated that FIG. 1 is for illustrative purposes and that various nodes, their locations, and/or their functions/modules may be changed, altered, added, or removed. For example, some nodes and/or functions/modules may be combined into a single entity. In a second example, a node and/or function/module may be located at or implemented by two or more nodes.

The subject matter described herein may be utilized for performing sound rendering or auditory displays which may augment graphical renderings and provide a user with an enhanced spatial sense of presence. For example, some of the driving applications of sound rendering include acoustic design of architectural models or outdoor scenes, walkthroughs of large computer aided design (CAD) models with sounds of machine parts or moving people, urban scenes with traffic, training systems, computer games, and the like.

The disclosed subject matter also presents novel techniques to compute fast diffuse reflections, higher-order edge diffraction, and automatic simplification of large datasets. Ray tracing has been widely used for offline and interactive sound propagation [19, 40, 6, 34]. In ray tracing, propagation paths are computed by generating rays from each source or receiver position and propagating them through the scene, modeling reflection and diffraction effects (e.g., via the use of one or more of modules 106-112).

The disclosed approach is targeted towards large and spacious models, and assumes homogeneous media and a constant sound speed. Geometric acoustic (GA) techniques are used to accurately compute early reflections (e.g., up to 10 orders) and assume that the surface primitives are large compared to the wavelength. Further, statistical methods are used to compute late reverberation.

The disclosed subject matter also builds on recent advances in interactive ray tracing for visual and sound rendering. Notably, ray tracing may be used to accelerate the image-source method for computing early specular reflections [40] and the uniform theory of diffraction (UTD) may be used to approximate edge diffraction. Frequency-dependent effects are modeled using different absorption and scattering coefficients for discrete frequency bands.

As described herein, a diffuse reflection occurs when sound energy is scattered into non-specular directions. The diffuse sound-energy density w at any point $\vec{p}$ in space at a time t in is given by equation (1), where L' is the distance from the surface element dS' to the listener, ç" is the angle of the sound wave which radiates from the surface element dS', 60 ($\vec{p}'$) is the reflection coefficient as a function of $\vec{p}$, B is the irradiation strength, c is the speed of sound, and $w_d(\vec{p}, t)$ is the direct sound contribution from the sound source [9, 25]:

$$w(\vec{p}, t) = \frac{1}{\pi c} \int \int_S \alpha(\vec{p}')B\left(\vec{p}', t - \frac{L'}{c}\right)\frac{\cos\varsigma''}{L'^2}dS' + w_d(\vec{p}, t). \quad (1)$$

In order to handle frequency-dependent absorption, $\alpha(\vec{p}')$ may be represented as a vector of attenuation values for discrete frequency bands. In sound rendering, the time and phase dependence of sound waves should be modeled. The time dependence is represented by the L'/c term that computes (e.g., using SPT module 108) the delay time due to that propagation along that path. This delay time can be used by SPT module 108 to determine the phase relationship between the original and reflected sound and is responsible for producing acoustic phenomena like echoes.

Since there is no closed-form solution for equation (1) for general scenes, traditional diffuse sound algorithms approximate this integral using numerical techniques. For example, diffuse path tracing [9] may be used to trace many random rays from each sound source and diffusely reflects these rays through the scene to solve the acoustic rendering equation [31, 4]. An intersection test is performed for each ray to calculate its intersection with the listener (e.g., a listener entity, such as a person), who is represented by a sphere the size of a human head. Rays that hit/intersect with a given listener position contribute to the final impulse response for that sound source at that listener's location. The path tracing algorithm can generate accurate results and is frequently used for offline acoustic simulation. Since diffuse path tracing is a Monte-Carlo method, it requires a very high number of ray samples to generate accurate results. Therefore, current techniques for interactive diffuse reflections are limited to very simple models and can only compute 1-3 orders of reflections [21, 33]. Some extensions have been proposed such as "diffuse rain" [45], which can drastically increase the number of ray contributions by generating an additional reflection from each ray hit point to the listener.

In order to accelerate diffuse reflection computation, ideas from radiosity algorithms that are widely used in visual and sound rendering may be used. Radiosity is an alternate method to path tracing that models diffuse reflections by decomposing the scene into small surface patches, computing view factors (or form factors) for each pair of patches, and computing the intensity for each patch as the sum of the contributions from all other patches. Radiosity has also been used to compute sound fields [11]. These approaches discretize the inner integral of equation (1) into the following equation for a single surface element [25]:

$$I_i(t) = \sum_{j: j \neq i} m_{j \to i} \alpha_j I_j\left(t - \frac{p_{j \to i}}{c}\right)\Delta S_j + I_{0 \to i}(t), \quad (2)$$

where $I_i(t)$ is the incident sound intensity at surface patch i at time t, $I_{0 \to i}(t)$ is the direct contribution from the source at patch i at time t, $I_j$ is the contribution from a surface patch j, and $m_{j \to i}$ is the view factor between patches j and i. The surface intensities for all patches in the scene are added (e.g., by SPT module 108) to compute the resulting sound field at a listener location p at time t:

$$w(\vec{p}, t) = \sum_i I_i(t) v_i(\vec{p}, t), \quad (3)$$

where $v_i(\vec{p}, t)$ is the visibility function for patch i that has range [0,1], which indicates the fraction of that patch visible to point $\vec{p}$. This formulation of sound-field computation benefits from less sampling noise than path tracing, but it also requires a high degree of surface subdivision to accurately solve the acoustic rendering equation. In addition, current radiosity-based algorithms are largely limited to static environments, because i) recomputing view factors at runtime is expensive and ii) the memory and time complexity increases with the surface area of the scene. This makes many radiosity-based algorithms unsuitable for large-scale interactive diffuse sound propagation in dynamic scenes.

Figure 2:
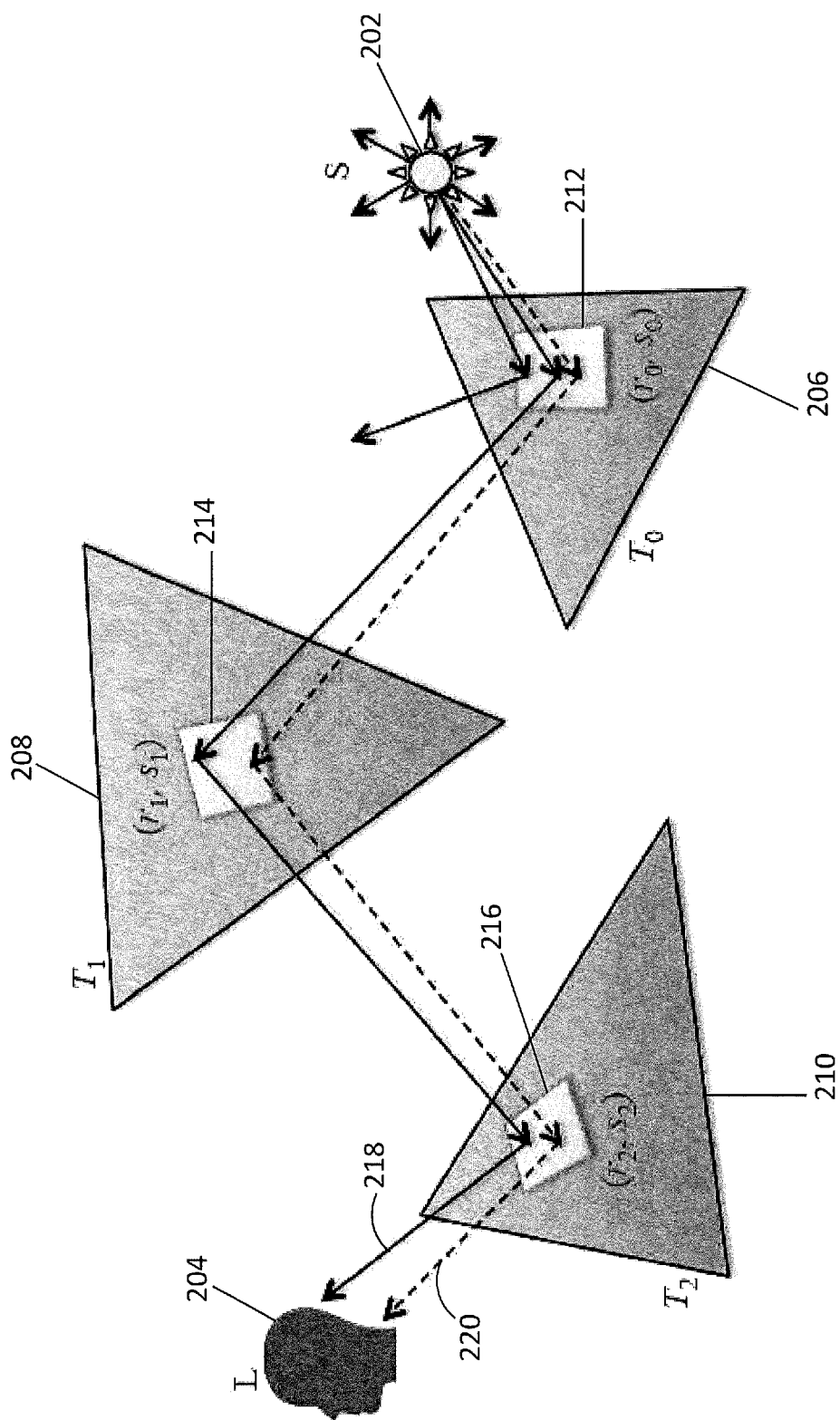
FIG. 2 is a diagram illustrating the grouping of coherent sound rays according to an embodiment of the subject matter described herein.

In some embodiments, SPT module 108 combines path tracing with radiosity-like patch subdivision to reduce sampling noise for interactive diffuse reflections. SPT module 108 may be configured to reuse the rays traced during previous frames for the current frame. SPT module 108 may be also configured based on the assumption that the changes in the locations of sound sources, listeners, and dynamic obstacles are small between successive frames. Therefore, rays that hit the same sequence of surface patches during different frames are grouped together by SPT module 108. The grouped rays' contributions are summed by SPT module 108 to compute a better estimate of the reflected sound intensity $I_t$ for that sequence of surface patches, as shown in FIG. 2. Compared with standard path tracing, SPT module 108 may be configured to reduce the number of rays required to compute accurate diffuse sound and improves temporal coherence of the resulting sound field. By projecting/shooting fewer sound rays per frame, computation time is reduced and the interactivity of path tracing for sound propagation is improved.

For example, FIG. 2 depicts an example set of 3rd-order diffuse ray paths. Rays leave a sound source S 202 and traverse a sequence of surface patches 212-216 which are respectively located within triangles 206-210 (e.g., see $\{T_0 (r_0, s_0), T_1(r_1, s_1), T_2(r_2, s_2)\}$). The rays then arrive at the listener L 204. As shown in FIG. 2, rays with dashed paths (e.g., ray 220) are from previous frames, while rays with solid paths (e.g., ray 218) are from the current frame. patches, as shown in FIG. 2. Compared with standard path tracing, SPT module 108 may be configured to perform the diffuse reflection algorithm to group these coherent rays together because the rays hit/traverse the same sequence of surface patches. The sound contribution at listener 204 is averaged over the time period, using rays from the previous and current frames.

The use of frame-to-frame coherence along with combining path tracing and radiosity methods has been investigated in visual rendering [18]. This includes caching of diffuse illuminance data (e.g., irradiance caching) to accelerate the computation of global illumination. The notion of reusing ray paths has been used in visual rendering techniques based on frameless rendering and progressive refinement. However, sound rendering differs from visual rendering in several ways. In particular, sound rendering involves computation of phase and time delay information, which results in different formulations. Additionally, radiosity algorithms for visual rendering require a fine subdivision to capture abrupt changes in the view factor such as with hard shadows [18]. On the other hand, the incoherence of diffuse sound rays implies that changes in the incident intensity are usually gradual. This allows for the use of larger surface patches in sound rendering [25].

Figure 3:
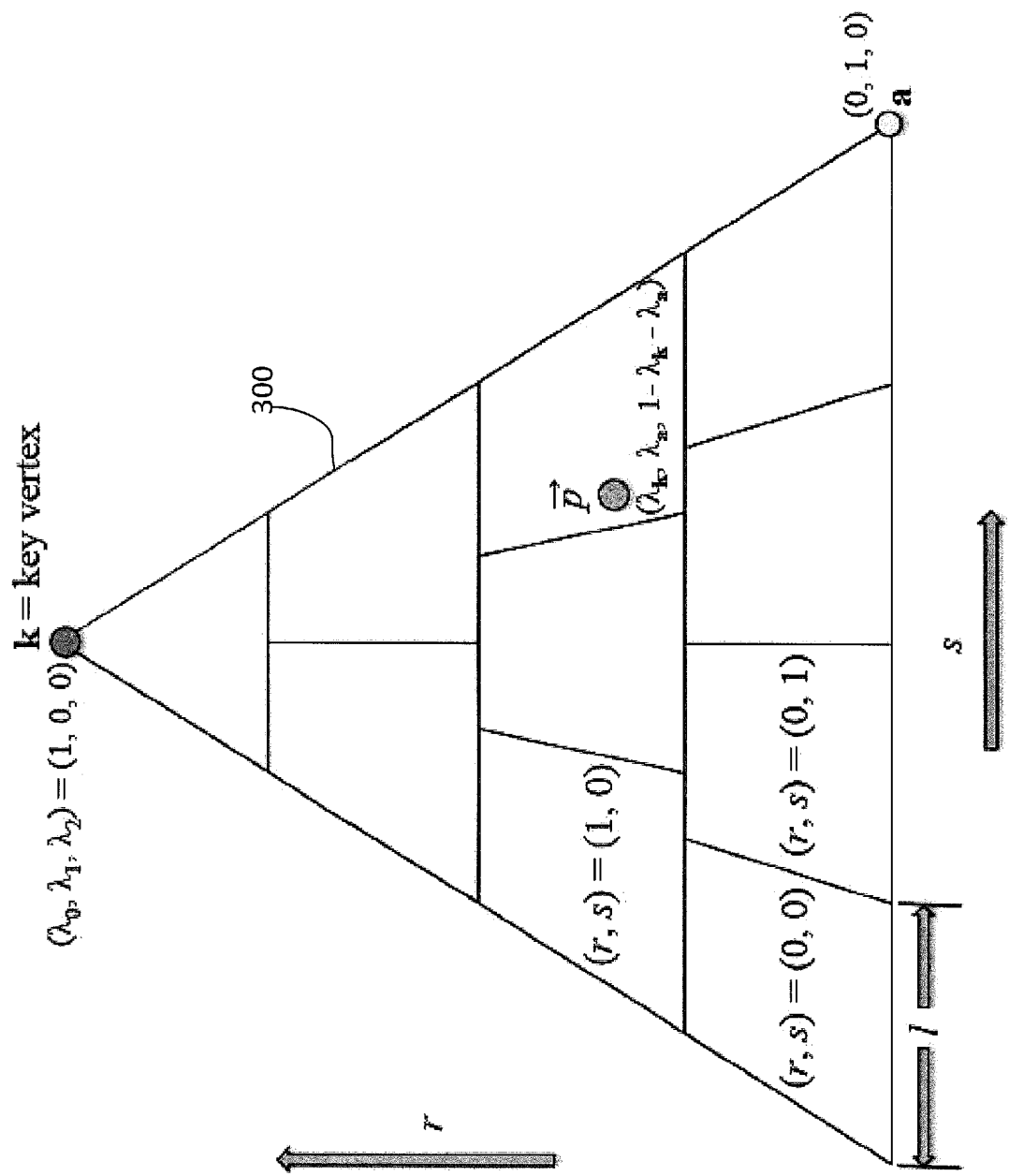
FIG. 3 is a diagram illustrating an exemplary triangle subdivision according to an embodiment of the subject matter described herein.

As part of a preprocessing step conducted by SPT module 108, the triangles are subdivided in the scene into a set of surface patches. This operation can also be performed efficiently at runtime if the scene geometry deforms. For the subdivision, each patch is approximately the same size and meets minimum spatial size criteria. In some embodiments, Barycentric coordinates may be used to partition each triangle in the input scene into a grid of quadrilateral and triangular patches. Patches are arranged as a 2-dimensional grid of entries with indices (r,s), as shown in FIG. 3. We do not store these patches explicitly; instead we use the Barycentric coordinates of each ray-triangle intersection, along with precomputed information about the triangle, to determine which surface patch contains the intersection point at runtime. This formulation requires only a few extra bytes per triangle.

Referring to FIG. 3, in order to precompute the subdivision for a given triangle T 300. SPT module 108 may be configured to select a vertex k of T as the key vertex for that triangle. For example, the vertex is the one that is incident to the longest altitude of T. The length of the altitude from k, d, is used to determine the number of rows in the subdivision $n_r=\lceil d/l \rceil$, where l is a parameter used to govern the resolution of the subdivision. In addition, the number of columns for the largest row is $n_s=\lceil e/l \rceil$ where e is the length of the edge opposite k. The number of columns $n_s^r$ for the rth row is determined by:

$$n_s^r = \left\lceil \frac{n_r - r}{n_r} n_s \right\rceil. \quad (4)$$

In order to determine this subdivision at runtime, SPT module 108 may only store the values of $n_r$, $n_s$, and the index of key vertex k for each triangle. The choice of subdivision size l determines the size of the patches and accuracy of the approach, as in radiosity-based algorithms. In general, l should be chosen such that the incident sound intensity does not change too much across adjacent patches. For example, referring to FIG. 3, SPT module 108 may be configured to subdivide triangle 300 into an array of indexed patches (r, s) based on the subdivision resolution l. SPT module 108 may compute the ray intersection point $\vec{p}$ with Barycentric coordinates $(\lambda_k, \lambda_a, 1-\lambda_k-\lambda_a)$, (e.g. (r, s)=(1,3)).

In some embodiments, SPT module 108 may be configured to maintain a separate hash-table cache (not shown) of diffuse reflectance data for each sound source. This cache is used to store the combined contributions of many sound rays from previous frames that are grouped based on the surface subdivision. Each cache entry corresponds to a unique series of surface patches $\{T_0(r_0, s_0), \ldots, T_n(r_n, s_n)\}$, where each element of the series indicates one of the triangles $T_i$ and a surface patch $(r_i, s_i)$ on $T_i$. This entry represents the n+1 diffuse reflections that have occurred for rays emitted along the path to the listener.

Each cache entry may also store the set of values $\{\eta, \mu, \hat{\alpha}, \hat{\delta}\}$. For example, $\eta$ is the number of rays following this entry's path that have hit the listener, $\mu$ is the total number of rays emitted from the source for all frames (while this entry was in the cache), $\hat{\alpha}=\Sigma\alpha$ represents the sum of the total frequency-dependent attenuation, e.g., $\alpha \in [0,1]$ (due to the n+1 diffuse reflections for all rays that have traveled the path for this entry), and $\hat{\delta}=\Sigma\delta$ represents the sum of the path lengths $\delta$ for all rays that have hit and/or traversed this sequence of surface patches while the entry was in the cache. From these values, the average incident sound source intensity $I_i$ for this patch sequence i received at the listener as a fraction of the total emitted energy can be computed by SPT module 108 as follows:

$$I_i = \frac{\eta}{\mu} \frac{\hat{\alpha}}{\eta}. \quad (5)$$

The value of $\eta/\mu$ estimates the average of the combined $m_{j \to i}$, $I_j$, and $I_{0 \to i}(t)$ terms from equation (2). Those terms together may allow SPT module 108 to determine the frequency-independent fraction of source energy reflected from a surface patch, which is the same value estimated by $\eta/\mu$. Similarly, $\hat{\alpha}/\eta$ approximates the average $\alpha_j$ term from Equation (2). To compute the average path length $\bar{\delta}$ for a cache entry, SPT module 108 may use:

$$\bar{\delta} = \frac{\hat{\delta}}{\eta}. \quad (6)$$

This average path length is divided by the speed of sound c in the propagation medium to determine the average delay time for this path.

In some embodiments, at the beginning of each simulation step, SPT module 108 may be configured to trace random rays from each sound source position and diffusely reflect those rays through the scene to an arbitrary maximum depth (e.g., 10), as in traditional path tracing. For each ray-triangle intersection, SPT module 108 may be configured to first find the surface patch, T(r,s), for the intersection point $\vec{p}$ on triangle T. SPT module 108 may then compute the Barycentric coordinates $(\lambda_0,\lambda_1,\lambda_2)$ of $\vec{p}$ with respect to triangle T. Next, SPT module 108 may be configured to select two of the three components of the Barycentric coordinates $(\lambda_k,\lambda_\alpha)$ from the set $(\lambda_0,\lambda_1,\lambda_2)$ in order to define the subdivision axes. As used herein, $\lambda_k$ is the component corresponding to the key vertex k, and $\lambda_\alpha$ is the component for the vertex a that is to the left of k on triangle T. Given $\lambda_k$ and $\lambda_\alpha$, SPT module 108 can then compute the row and column indices (r, s) for the surface patch containing $\vec{p}$, as shown in FIG. 3: $r=\lfloor \lambda_k \cdot n_r \rfloor$, $s=\lfloor \lambda_\alpha \cdot n_r' \rfloor$. This patch T(r, s) is added to the patch sequence for the ray that is currently being propagated.

When the ray is reflected, the outgoing ray is tested to see if the ray intersects the listener's detection sphere. If so, the sequence of previous surface patches (e.g., $\{T_0(r_0,s_0), \ldots, T_n(r_n,s_n)\}$), where reflections occurred along this path are used to access the diffuse cache. If SPT module 108 determines that there was an existing cache entry for that specific patch sequence, the entry is updated with the contribution for that ray:

$$\eta_{new}=\eta+1; \hat{\alpha}_{new}=\hat{\alpha}+\alpha_{new}; \hat{\delta}_{new}=\hat{\delta}+\delta_{new}. \quad (7)$$

If there is no entry corresponding to this sequence of patches, a new entry is inserted by SPT module 108 into the cache and the corresponding parameters are set as $\eta=1$, $\mu=0$, $\hat{\alpha}=\alpha_{new}$, $\hat{\delta}=\delta_{new}$.

After all the rays have been traced by SPT module 108 from the source and the cache entries updated for rays that hit/arrive at the listener, the cache contains entries that correspond to the accumulated contribution of groups of rays that have traveled along similar paths to the listener during the current frame or previous frames. Next, SPT module 108 computes the final impulse response for this source-listener combination from the cache by iterating through all entries and generating a delayed impulse for each entry. For each entry, the value of $\mu$ is increased by the total number of rays emitted from the source during this frame. In some embodiments, SPT module 108 can use equation (5) to compute the incident intensity $I_i$ for this cache entry. If SPT module 108 determines that this intensity value is less than some threshold $\kappa$, then very few rays have hit/traversed the sequence of surface patches corresponding to the cache entry in recent frames. In this scenario, the cache entry is removed by SPT module 108 because the cache entry does not significantly contribute to the final impulse response at the listener's location. In some embodiments, SPT module 108 may use a cutoff threshold of $\kappa=-60$ dB or 1/1000th of the original source's energy. Further, this threshold may be used in measuring the reverberation time, RT60, of an acoustical space [10]. Cache entries that exceed $\kappa$ in energy (as determined by SPT module 108) contribute to the output impulse response. The delay time for this entry's contribution is computed by SPT module 108 using the average path length from equation (6) and the speed of sound. Finally, this contribution is added by SPT module 108 to the output sound field at the listener's location using equation (3), where the value of the visibility function $v_i$ is always 1 as all of the sound source contributions for the path are known to intersect the listener.

In order to avoid storing reflectance data that is no longer accurate for the current scene configuration, SPT module 108 may be configured to bind the maximum age in seconds of the data stored in the cache. Any cache entry that is older than some threshold time $\tau$ in seconds is removed by SPT module 108. This threshold determines the maximum temporal span of the moving average from equations (5) and (6) and the maximum response time for changes in the scene configuration. A larger value for $\tau$ increases the accuracy for the estimate of $I_i$ by using a bigger averaging window and more rays. However, this may not be consistent with the current scene configuration if sources, listeners, or objects in the scene change position abruptly. A small value for $\tau$ requires more rays to be traced per frame to maintain accurate output, since the temporal averaging for values stored in the cache will have less effect.

This diffuse path caching approach conducted by SPT module 108 can incrementally compute a moving average of the incident intensity $I_i(t)$ from equation (2) for each sequence of surface patch reflections that arrive at the listener. SPT module 108 may be configured to sample these values using traditional path tracing, but use a radiosity-like subdivision to take advantage of the coherence of rays from previous frames. SPT module 108 may also be configured to group the rays based on the sequence of reflections that have occurred. By grouping rays over many frames and reusing those results, SPT module 108 may avoid undersampling artifacts, yet may require far fewer rays emitted from the sound sources, thereby reducing the time needed to compute realistic diffuse reflections. Like radiosity-based algorithms, the algorithm facilitated by SPT module 108 converges to traditional diffuse path tracing with a suitably small subdivision resolution l. However, if l is too small, the algorithm may require a greater number of rays to be traced and a larger diffuse path cache. In this scenario, fewer rays are grouped together and the effect of path reuse is reduced, resulting in a smaller benefit over traditional diffuse path tracing.

In order to model edge diffraction, SPT module 108 may be configured to use an approximation based on the uniform theory of diffraction (UTD), which has been used in interactive geometric sound propagation systems [36, 33, 34, 29]. However, these algorithms are limited to either static scenes or can only compute first order edge diffraction in dynamic scenes. The problem of finding high-order diffraction paths efficiently is difficult due to the number of edge pairs that need to be considered. A naive approach has running time that can be exponential in the maximum diffraction order. This is due to the fact that at each level of recursive diffraction, all other diffraction edges in the scene must be considered. Prior methods have used beam tracing [36] or frustum tracing [33] to compute secondary diffraction edge visibility at runtime. However, this becomes expensive for more than 1st order diffraction in complex scenes, as a large number of complex beam or frustum intersection tests are required.

As indicated above, the disclosed subject matter may utilize a HED module 110 that can be configured to execute a novel algorithm for computing high-order diffraction paths efficiently using a preprocessed edge visibility graph. This graph structure minimizes the number of diffraction edges that need to be considered at runtime and avoids any runtime edge-edge visibility queries. Most importantly, the approach is valid for any source or listener positions. More specifically, the visibility graph can be computed by HED module 110 once, between all edges of static objects, and then used for all scene configurations.

In some embodiments, HED module 110 may be configured to compute one visibility graph for all edges of all static objects in the scene. Moreover, a separate visibility graph can be computed by HED module 110 for the edges of each dynamic object. In some embodiments, HED module 110 does not, however, take into account the relative visibility of edges of two different dynamic objects or of one static and one dynamic object.

Furthermore, HED module 110 may be configured to assume that dynamic objects undergo rigid transformations, and that a precomputed visibility graph for that object's static mesh will remain valid. The formulation supported by HED module 110 allows a simple graph search to be performed at runtime to find high-order diffraction paths that occur within a single graph. Further, HED module 110 may be configured to not consider the visibility between edges belonging to different visibility graphs.

Figure 4:
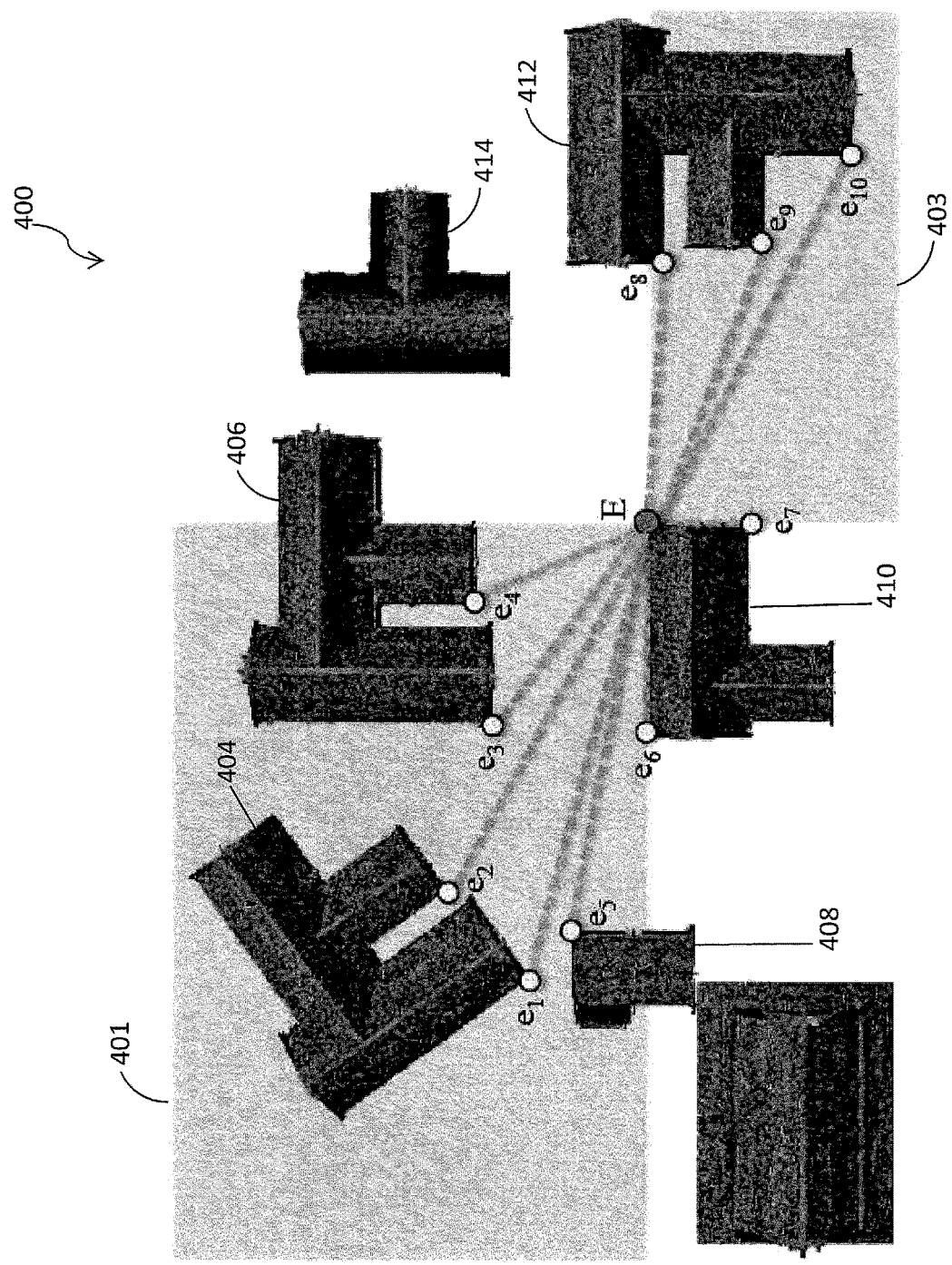
FIG. 4 is a diagram illustrating a top-down view of a diffraction edge visibility graph according to an embodiment of the subject matter described herein.

During the preprocessing step, each edge in a mesh is classified by HED module 110 as a diffracting edge or non-diffracting edge based on the angle between the edges' neighboring triangles. HED module 110 may be configured to compute a graph data structure containing information about which edges are visible to each of the diffraction edges using region-based visibility algorithms [3]. For each diffraction edge in the mesh, HED module 110 may be configured to check all other diffraction edges to see whether those edges satisfy the orientation criteria for mutually diffracting edges, as shown in FIG. 4. If at least some part of either edge in a pair is behind the plane of the neighboring triangles for the other edge, there is the possibility that diffraction can occur over that edge pair. This test is used to cull edge pairs that cannot be combined as diffraction edges. If two edges can form a diffraction path and are visible to each other, a link is added to the graph structure between these edges. FIG. 4 shows the visible edges for a single edge in an example visibility graph. For example, FIG. 4 depicts a top-down view of a portion of a diffraction edge visibility graph 400 for a small village scene, shown in FIG. 4 as edge E. Edges $e_{1...10}$ are visible to edge E and intersect the gray-shaded areas (areas 401 and 403) that represent the shadow regions for E. In some embodiments, HED module 110 may be configure to only consider diffraction effects in shadow regions 401 and 403. Regions 401 and 403 are defined as the set of points where only one of the planes that contain the neighboring triangles for E has a normal pointing towards a given point. Edge E must also intersect shadow regions 401 and 403 for each edge $e_{1...10}$ for those edge pairs to be stored in the visibility graph 400.

Figure 5:
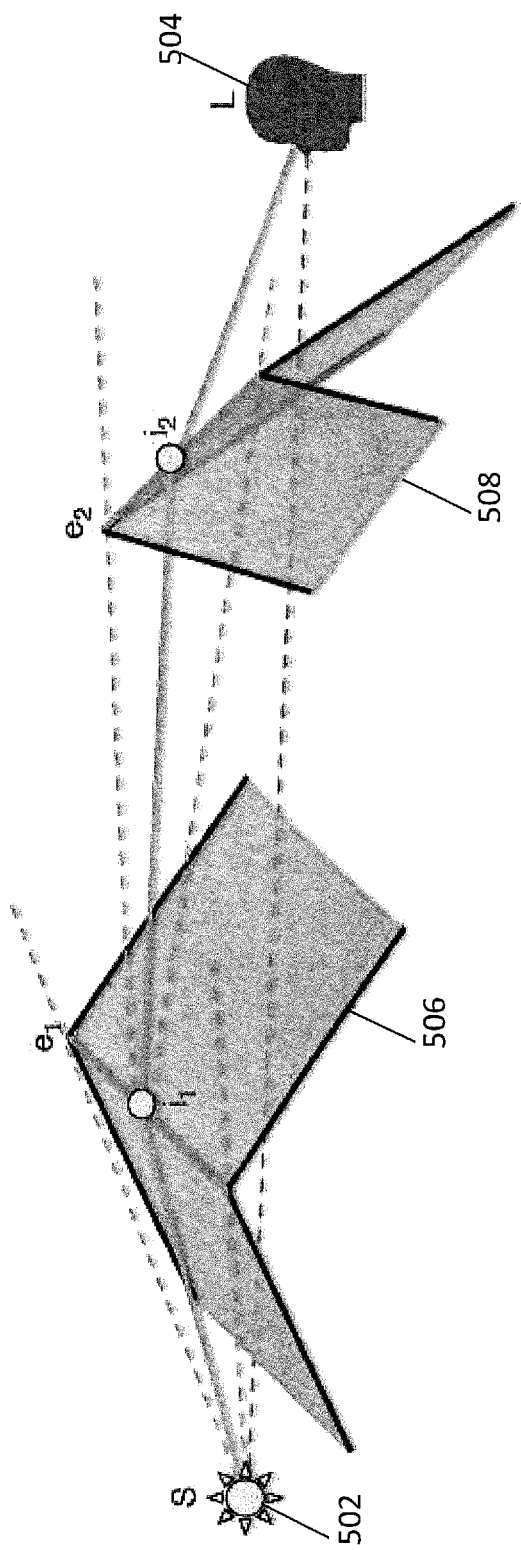
FIG. 5 is a diagram illustrating a diffracted path taken by exemplary sound rays according to an embodiment of the subject matter described herein.

At runtime, HED module 110 uses the primary rays traced in the diffuse step described above to determine a set of triangles visible to each source. For each visible triangle, HED module 110 may check to see if the triangle has any diffraction edges. If so, HED module 110 can search the corresponding visibility graph, moving towards the listener, with that edge as the starting point. The recursive graph search proceeds in a depth-first manner until a maximum depth is reached, at which point the search backtracks and checks other sequences of edges. At each step in the graph search conducted by HED module 110, all diffraction edges that were preprocessed as visible from the current diffraction edge are recursively checked to determine if there is a path to the listener. For each edge, HED module 110 may first compute the shortest path between the source and the listener over that edge, then determine the point of closest approach on the edge to the line connecting the source and listener [8]. This set of closest points represents the source image positions on each edge in a series of diffractions. A neighboring edge in the graph is checked by HED module 110 for higher-order diffraction paths if the point of closest approach on the edge lies on the interval of that edge, and if that point is contained within the previous edge's diffraction shadow region, as shown in FIG. 5. In some embodiments, HED module 110 may be configured to consider diffraction that only occurs in the shadow region for an edge [36]. A point is contained in the shadow region for an edge if it is behind the plane formed by the previous image source position and the edge and is in front of the triangle that defines the shadow region boundary. In some embodiments, these simple, fast tests enable HED module 110 to avoid path validation checks for a large fraction of the potential diffraction paths.

For example, FIG. 5 depicts a second-order diffraction path. Rays may originate from a source 502 and traverse via source image positions $i_1$ and $i_2$ to a listening entity 504 (e.g., listener L). Notably, source image positions $i_1$ and $i_2$ are only valid if they lie behind the plane formed by the last image position and the current edge. The diffracted sound takes the shortest path over the edges 506 and 508 and is valid only if the image positions lie on the edge(s) and if the path is not obstructed.

Finally, if the listener is contained within the next diffraction shadow region, HED module 110 may validate the diffraction path to that listener by tracing rays between the previously computed sequence of image positions on the edges. If the ray traced between two consecutive image source positions does not hit an obstacle, that segment of the path is determined to be valid by HED module 110. If the entire path from the source to listener over the sequence of edges is found to be unobstructed, then HED module 110 may compute a frequency-dependent attenuation, using the UTD model, for that path to account for diffraction. Since the UTD attenuation from a single edge diffraction only depends on the local edge geometry and the previous and next source image positions, the attenuation can be computed by HED module 110 separately for each edge $e_j$ along a diffraction path. In some embodiments, the attenuation coefficients are multiplied by HED module 110 for all edges in a path produces the total attenuation due from the high-order diffraction path, similar to the formulation used in [36]. Each valid path is then added by HED module 110 to the final output impulse response for the sound source.

Many large databases are designed for visual rendering and include highly tessellated models with detailed features. Such models may have higher complexity than that is needed for sound propagation. Geometric acoustics approaches are valid for surfaces that are large compared to the wavelength. There has been some work on simplifying geometric models or use of level-of-detail techniques for acoustic simulation [31, 26, 38]. However, a key challenge in the field is to automatically generate a simplification that preserves the basic acoustic principles, including reflections, scattering and diffraction. For example, some techniques based on geometric reduction applied to room models can change the reverberation time of the simplified model [31]. And, in many cases, geometric simplification is performed by hand or using authoring tools, but it is hard to extend these approaches to complex models.

In some embodiments, HED module 110 may be configured to compute early reflections and diffractions is based on ray tracing and use bounding volume hierarchies to accelerate ray intersection tests. In general, the cost of updating the hierarchy for dynamic scenes by refitting is a linear function of the model complexity of dynamic objects. The cost of intersection computation is almost a logarithmic function of the number of polygons. Because of logarithmic complexity, the relative benefit of model simplification on ray-tracing intersection computation is not high. Consequently, m HED module 110 may be configured to use the original geometric representation for computing specular and diffuse reflections.

One aspect of the diffraction algorithm supported by HED module 110 is the identification of important diffraction edges in the scene. The complexity of visibility-graph computation and runtime traversal can increase significantly with the number of edges in the model. Some prior approaches for UTD-based diffraction computation are either limited to coarse models [36] or consider all edges that have neighboring non-planar triangles [33]. The latter approach can result in large number of small diffraction edges in complex scenes with detailed geometric representations. In practice, the UTD edge diffraction algorithm tends to be more accurate for longer edges since the presence of a high number of small edges can result in inaccurate results.

Figure 6:
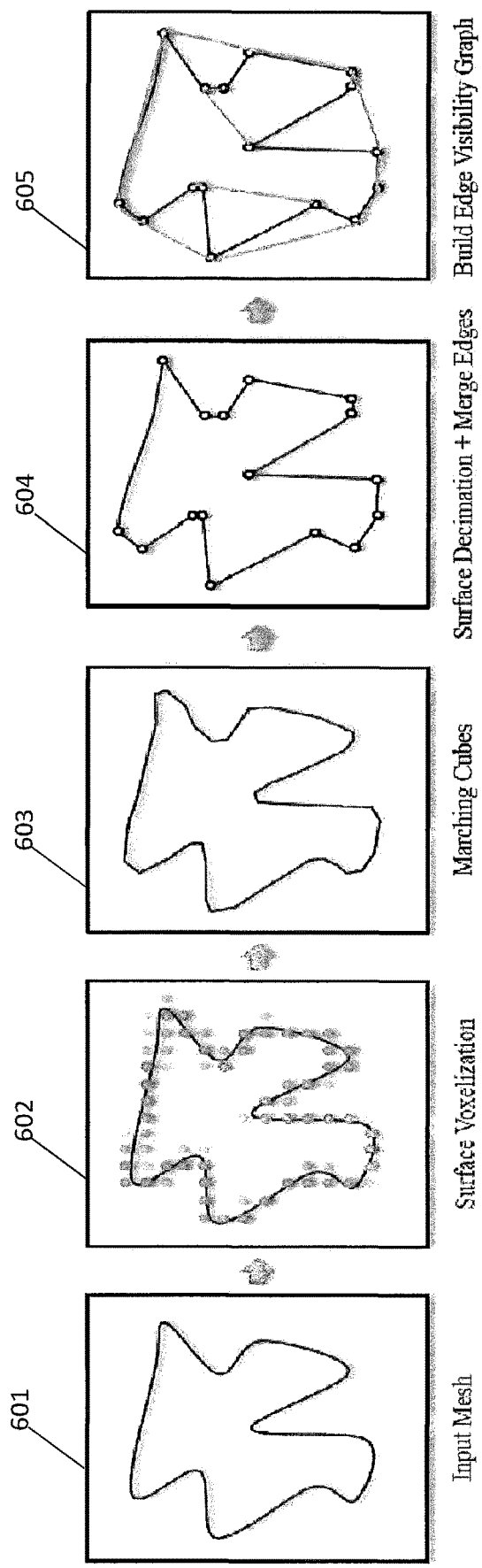
FIG. 6 is a diagram illustrating various stages of a edge diffraction simplification process according to an embodiment of the subject matter described herein.

In some embodiments, EDS module 112 conducts a simplification technique that generates a reduced set of diffraction edges for interactive acoustic simulation. To be specific, EDS module 112 may generate meshes corresponding to different simulation wavelengths. Since this simplified mesh is used only for UTD-based edge diffraction computation, the simplification does not affect the the accuracy of reflections. FIG. 6 shows an overview of the mesh processing pipeline that EDS module 112 utilizes. In some embodiments, this pipeline executed by EDS module 112 extends the pipeline described in [47] with additional edge merging and visibility graph steps. Notably, FIG. 6 illustrates a number of stages of the simplification algorithm that may be performed by EDS module 112. In particular, stage 601 illustrates the input of a mesh, stage 602 illustrates the surface-voxelization of the input mesh, stage 603 illustrates isosurface extractions (e.g., "marching cubes"), and stage 604 illustrates both surface decimation based on edge-collapses and the merging of collinear diffraction edges. Lastly, stage 605 illustrates the building of an edge visibility graph (e.g., visibility graph computation).

In some embodiments, EDS module 112 may perform a preprocessing step that includes the computing of a hierarchical surface voxelization of each object. In some embodiments, the value of a voxel is determined based on the distance to the closest triangle [15]. This allows EDS module 112 to handle non-closed geometric primitives better than traditional voxelization algorithms, which are based on scan-conversion. The voxelization results in a tree of voxels, where the voxel resolution doubles at each successive tree depth. This tree can be used by EDS module 112 to generate surface approximations corresponding to different wavelengths. For example, EDS module 112 may be configured to choose the tree depth where the voxel resolution is at least half the required wavelength. This resolution is chosen by EDS module 112 based on the spatial Nyquist distance $h=c/f_{max}$, where $f_{max}$ is the highest simulated frequency [42]. The discretization imposed by the voxelization removes details that are smaller than the voxel resolution.

In some embodiments, EDS module 112 may be configured to triangulate a level in the voxel tree by applying the marching cubes algorithm [22]. This generates a triangular mesh corresponding to an isosurface in the voxel grid. However, this mesh may not be suitable for computing a reduced set of diffraction edges. For instance, the voxelization and triangulation computation approximate large triangles in the original model with many smaller ones that lie in the same plane. In order to address this issue, EDS module 112 may first compute the adjacency information for the mesh by merging coincident vertices. Next, EDS module 112 may apply the edge-collapse algorithm based on the quadric error metric [13] until an error threshold is exceeded. These decimation operations progressively merge vertices that share an edge into a single vertex by minimizing the resulting error in the mesh's shape. This results in a highly simplified mesh that preserves the largest features from the original model, while removing small details that would produce extraneous diffraction edges. Finally, EDS module 112 may determine a set of candidate diffraction edges using a heuristic that chooses edges with a significant deviation from being planar. Given this simplified model, EDS module 112 can compute the visibility graph and use that for higher order edge diffraction computation.

In order to process very large models efficiently, EDS module 112 may be configured to split the input scene into regions of a maximum size. In some embodiments, these regions are voxelized, triangulated, and simplified in parallel. The simplified regions are combined to form the output simplified mesh. An edge collapse algorithm executed by EDS module 112 preserves the boundaries of each region in order to avoid seams between them. Since EDS module 112 may be configured to independently process many smaller regions rather than an entire large mesh at once, the memory footprint of the algorithm is only a few hundred MBs, whereas naively processing an entire large scene could take 10's of GB of RAM.

The disclosed subject matter may be implemented in a various ways or by various means. For example, in some embodiments, SPT module 108 may trace rays in a random uniform distribution from each source location to compute diffuse sound. These rays are propagated through the scene via diffuse reflections up to an arbitrary maximum reflection depth (e.g., 10). The number of rays needed to achieve accurate sound is scene-dependent. In many instances, SPT module 108 traced 1000 rays from each source except where noted. In some embodiments, SPT module 108 can use far fewer rays for diffuse sound path tracing than for visual rendering because the listener detection sphere is usually much larger than a camera pixel and because human hearing is more tolerant of error than visual perception. In addition, the diffuse cache accumulates the results of rays traced on previous frames, thus requiring less rays. Specular reflections are computed separately from diffuse reflections by tracing uniform random rays from the listener's position to sample the set of possible specular paths. In some embodiments, these rays can be specularly reflect to a chosen maximum depth and SPT module 108 may be configured to use this information to build a set of candidate paths with each path represented as a series of triangle reflectors. Finally, SPT module 108 may check each candidate path to determine if there is a valid specular reflection along the path from the listener to each source in the scene using the image-source method. If so, an output specular path is produced by SPT module 108. This is similar to [21, 29]. In some embodiments, SPT module 108 accelerate ray tracing using bounding volume hierarchies that can be efficiently updated for moving or deforming objects. SPT module 108 may also use 4-band frequency-dependent reflection attenuation coefficients α that are applied for each material type with the frequency bands: 0-250 Hz, 250-1000 Hz, 1000-4000 Hz, and 4000-22100 Hz. Each surface material is also assigned a scattering coefficient that determines the fraction of reflected sound that is scattered.

In some embodiments, SPT module 108 may be configured to leverage the single instruction, multiple data (SIMD) and multi-threading capabilities of current CPUs to accelerate the computation. For example, SPT module 108 may be configured to run the different components of the sound propagation system separately and in parallel. The diffuse and edge-diffraction components for every sound source are each computed by HED module 110 on separate threads that run concurrently. The specular contributions are computed by SPT module 108 by tracing rays from the listener's position. Once all the threads finish the current frame, the resulting propagation paths for each thread are gathered and sent to the audio rendering subsystem. The disclosed example implementation makes use of all available CPU hardware threads. In some embodiments, the modules responsible for supporting these sound propagation algorithms are implemented in C++ and make use of SIMD instructions and fast ray tracing.

The diffuse system supports scenes with moving sound sources, listeners, and objects. The diffuse triangle subdivision described above is valid for objects undergoing rigid motion and can be updated in real time if an object deforms or undergoes topological changes. In some embodiments, the subdivision can be recomputed for a large city benchmark (254,903 triangles) in 11.5 milliseconds (ms) using a single CPU core. The bounding volume hierarchy used for ray tracing can also be updated in less than 1 ms when objects in a scene undergo rigid motion, and allows fast refitting if objects deform. Since the diffuse technique uses a persistent cache to conduct time-averaging of diffuse paths, it may also be necessary to clear the cache if there is a large sudden change in the scene. The diffraction algorithm can also handle moving sources, listeners, and objects, but with only a limited level of dynamism. The high-order diffraction assumes that the visibility relationship between the edges doesn't change. As a result, it does not model diffraction effects between the edges of two different dynamic objects or between one dynamic and one static object. However, the approach can model high-order diffraction that occurs between edges of the same dynamic object undergoing affine transformations.

In order to render the audio output of the sound propagation algorithms, SPT module 108 may be configured to use a linearly interpolating delay line for each propagation path [37]. The smoothness of the interpolation is determined by a parameter that specifies the time for a change in propagation path amplitude or delay. Longer interpolation time produces smoother audio, especially at the boundary between the lit and diffraction shadow region, but results in a higher latency for these transitions. For example, the source audio is split at runtime into four (4) frequency bands that correspond to the bands used for material properties with Linkwitz-Riley 4th-order crossover filters. This allows SPT module 108 to utilize a renderer to efficiently model frequency-dependent effects by applying different gains to each band. Audio for all frequency bands is rendered separately based on the frequency-dependent attenuation coefficients for the path, then mixed (added) together at the output to produce the final audio. In some embodiments, SPT module 108 may perform vector-based amplitude panning to spatialize the audio for each propagation path separately using the path's direction from the listener. As the audio for each path is rendered, it is accumulated in a common output audio buffer. Further, SPT module 108 may use a statistical model for late-reverberation based on the Eyring reverb time equation [10] that dynamically estimates the mean free path and visible surface area in the scene using diffuse sound rays. The mean free path is used by SPT module 108 to approximate the effective scene volume with the well-known equation $V = \bar{l}S/4$, relating the volume (V), mean free path ($\bar{l}$), and surface area (S) of the environment: The $RT_{60}$ from this model is used as input for a Schroeder-type reverberator [48] that is mixed with the early propagation paths computed by a geometric acoustics algorithm supported by SPT module 108. A delay based on the shortest diffuse path delay time is applied to the reverberator to align it with the early diffuse reflections. In some embodiments, all audio rendering is performed at 44.1 kHz and SPT module 108 uses SIMD instructions to vectorize the rendering of frequency bands.

In some embodiments, SPT module 108 may be configured to analyze have the runtime performance as well as accuracy of our diffuse reflection computation algorithms. For example, a value of $l=0.5$ m for simulations may be selected. In some embodiments, SPT module 108 may support an incremental algorithm that is able to simulate over 10 orders of reflection in the scenes at around 50-60 Hz for a single sound source. While 1000 rays were used with one approach, its accuracy is compared with two versions of path tracing: 1000 rays and 10000 rays, and perform 10 orders of reflection. The accuracy of the algorithm is comparable to that of path tracing with 10000 rays, with an average error of of 2.27 dB. On the other hand, path tracing with only 1000 rays, produces noisier results and average error of 6.69 dB. The temporal averaging of the method dramatically improves the results for a given number of emitted rays (i.e. 1000 rays). The approach is effective at improving the accuracy of low-intensity sound in the left and right portions of the graph.

In order to evaluate the performance of high order edge diffraction algorithm, HED module 110 may be configured to measure how the approach scales with the maximum diffraction order. In the worst case, the complexity of GA-based diffraction algorithms is of the form $O(n^d)$ where n is the number of neighbors for each edge in the visibility graph and d is the maximum diffraction order. HED module 110 may be configured to report both the average time to compute diffraction for the benchmark scenes, and the maximum time spent for any instance of the source and location. This is due to the fact that the performance of our diffraction varies considerably with the source and listener positions. For example, for certain positions, the time spent in searching the visibility graph can be high, as some of the vertices in the visibility graph may have a high number of neighbors. In practice, the approach enables computation of 5th or 6th order diffraction at real-time rates in benchmarks. Since precomputed visibility information is used, no runtime edge-edge visibility checks are performed. This dramatically reduces the number of edge pairs that need to be considered for high-order diffraction paths.

The simplification algorithm executed bye EDS module 112 can generate different approximations as a function of the wavelength. In one implementation, the simplifications are generated based on wavelength $\lambda=0.25$ m, corresponding to a frequency of 1.3 kHz, and a voxel size of 0.125 m. It was determined that the simplification algorithm significantly reduces the number of diffraction edges for the benchmark scenes. Notably, the number of edges can be reduced to around 30-90% of the original number of diffraction edges for the unsimplified model.

For small scenes, the simplification algorithm takes only a few seconds while large scenes that are as large as 50 million cublic meters ($m^3$) can be simplified in minutes. In general, the simplification time increases with the scene volume because more voxels are needed to meet the wavelength spatial resolution. The voxelization approach is O(n log n) with respect to the number of triangles in original mesh. Simplified models are used for visibility graph computation. Since the number of edges are reduced, it significantly speeds up visibility graph computation and also reduces the size of visibility graph.

The prior geometric techniques for diffuse reflections are based on path tracing [21, 1,33]. The main benefit of the disclosed method arises from the fact that almost one order of magnitude fewer rays can be shot as compared to path tracing to achieve similar accuracy. This is due to the fact that temporal averaging may be performed, which can significantly improve the accuracy. The RESound system [33] takes about 250-500 ms to compute up to 3 orders of diffuse reflections (with 200K rays) on models with 60-280K triangles using seven threads on a multi-core CPU. Conversely, the disclosed algorithm takes less than 15 ms per source to compute up to 10 orders of diffuse reflections. Other recent work is based on the acoustic rendering equation [30, 4] and is used to precompute higher order reflections and diffraction for mostly static scenes. These approaches are complimentary to the formulation of the disclosed subject matter. For example, the diffuse algorithm can be used to accelerate early reflection computation in [4].

In terms of edge diffraction, prior techniques are limited to coarse static models [36] or first order edge diffraction in dynamic scenes [34, 29]. These approaches make no assumptions on edge visibility at runtime and therefore must compute a visible set of high-order diffraction edges for each edge on every frame. Generally this operation is performed by intersecting shadow-region frusta with the scene or by sampling edge visibility by tracing rays in the shadow region. This must be performed recursively for each edge considered for diffraction and becomes non-interactive (i.e., more than 500-1000 ms) at more than one or two orders of diffraction. Furthermore, wavelength-based simplification is used, which makes it possible to perform high-order edge diffraction in complex scenes.

The UTD-based diffraction technique was compared with the offline BTM diffraction model [32] on a simple scene with a rectangular obstacle (e.g., 12 edges) and a single sound source. The BTM model integrates the diffraction that occurs over the entire extent of each edge, whereas UTD only considers diffraction over a single point on an edge. It was observed that the formulation based on UTD diffraction model overestimates the amount of high-frequency attenuation versus BTM. The error in the frequency response was 3.10 dB for 1st-order diffraction and 3.61 dB for 2nd-order diffraction.

In conclusion, different algorithms have presented to enable interactive geometric sound propagation in complex scenes. The main contributions include a novel algorithm for diffuse reflections and higher order diffraction. Further, an approach to simplify the scene for edge diffraction and thereby making it possible to automatically handle large geometric databases for sound propagation is disclosed. Notably, more than an order-of-magnitude performance improvement over prior methods has been observed and the accuracy is comparable to those methods. Thus, the disclosed subject matter is a unique approach that can interactively compute higher-order diffraction and diffuse reflections in complex environments to generate plausible sound effects.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The disclosure of each of the following references is incorporated herein by reference in its entirety.

[1] ALARCAO, et al., "An auralization system for real time room acoustics simulation," Proceedings of Tecniacustica, (2009).

[2] ALLEN, et al., "Image method for efficiently simulating small-room acoustics," The Journal of the Acoustical Society of America, Volume 65, Issue 4 (April), pp 943-950, (1979).

[3] ANTANI, et al., "Efficient finite-edge diffraction using conservative from-region visibility," Applied Acoustics, Volume 73, pp 218-233, (2012).

[4] ANTANI, et al., "Interactive sound propagation using compact acoustic transfer operators," ACM Transactions on Graphics, Volume 31, Issue 1 (February), pp 7:1-7:12, (2012).

[5] ATTENBOROUGH, et al., "Predicting Outdoor Sound," Taylor and Francis, New York, (2007).

[6] BERTRAM, et al., "Phonon tracing for auralization and visualization of sound," Proceedings of IEEE Visualization, pp 151-158, (2005).

[7] CHANDAK, et al., "Fastv: From-point visibility culling on complex models," Computer Graphics Forum (Proc. of EGSR), Volume 28, Issue 3, pp. 1237-1247, (2009).

[8] ECONOMOU, et al., "The significance of sound diffraction effects in predicting acoustics in ancient theatres," Acta Acustica united with Acustica, Volume 99, Issue 1, pp. 48-57, (2013).

[9] EMBRECHTS, et al., "Broad spectrum diffusion model for room acoustics ray-tracing algorithms," The Journal of the Acoustical Society of America, Volume 107, Issue 4, pp. 2068-2081, (2000).

[10] EYRING, C. F, "Reverberation time in "dead" rooms," The Journal of the Acoustical Society of America, Volume 1, Issue 2A (January), pp 217-241, (1930).

[11] FRANZONI, et al., "An acoustic boundary element method based on energy and intensity variables for prediction of high-frequency broadband sound fields," The Journal of the Acoustical Society of America, Volume 110, Article 3071, (2001).

[12] FUNKHOUSER, et al., "A beam tracing approach to acoustic modeling for interactive virtual environments," Proceedings of ACM SIGGRAPH, pp 21-32, (1998).

[13] GARLAND, et al., "Surface simplification using quadric error metrics," Proceedings of the 24th annual conference on Computer graphics and interactive techniques, ACM Press/Addison-Wesley Publishing Company, pp 209-216, (1997).

[14] GUMEROV, et al., "A broadband fast multipole accelerated boundary element method for the three-dimensional helmholtz equation," Journal of the Acoustical Society of America, Volume 125, Issue 1, pp 191-205, (2009).

[15] HUANG, et al., "An accurate method for voxelizing polygon meshes," Volume Visualization, 1998. IEEE Symposium on, IEEE, pp 119-126, (1998).

[16] JAMES, et al., "Precomputed acoustic transfer: output-sensitive, accurate sound generation for geometrically complex vibration sources," Proceedings of ACM SIGGRAPH, pp 987-995, (2006).

[17] KOUYOUMJIAN, et al., "A uniform geometrical theory of diffraction for an edge in a perfectly conducting surface," Proceedings of the IEEE, Volume 62, Issue 11, pp 1448-1461, (1974).

[18] KRIVANEK, et al., "Practical Global Illumination with Irradiance Caching," ACM SIGGRAPH Course Notes, (2008).

[19] KROKSTAD, et al., "Calculating the acoustic room response by the use of a ray tracing technique," Journal of Sound and Vibration, Volume 8, Issue 1 (July), pp 118-125, (1968).

[20] KUTTRUFF, H, "Acoustics: An Introduction," Taylor and Francis, New York, (2007).

[21] LENTZ, et al., "Virtual reality system with integrated sound field simulation and reproduction," EURASIP Journal on Advances in Singal Processing 2007 (January), pp 187-187, (2007).

[22] LORENSEN, et al., "Marching cubes: A high resolution 3d surface construction algorithm," ACM Siggraph Computer Graphics, Volume 21, ACM, pp 163-169, (1987).

[23] MEHRA, et al., "Wave-based sound propagation in large open scenes using an equivalent source formulation," ACM Transactions on Graphics, Volume 32, Issue 2, pp 19:1-19:13, (2013).

[24] MOECK, et al., "Progressive perceptual audio rendering of complex scenes," Proceedings of Symposium on Interactive 3D graphics and games, ACM, pp 189-196, (2007).

[25] NIRONEN, H, "Diffuse Reflections in Room Acoustics Modelling," PhD thesis, Helsinki University of Technology, (2004).

[26] PELZER, et al., "Frequency- and time-dependent geometry for real-time auralizations," Proceedings of 20th International Congress on Acoustics, ICA, (2010).

[27] RAGHUVANSHI, et al., "Precomputed wave simulation for real-time sound propagation of dynamic sources in complex scenes," ACM Transactions on Graphics, Volume 29, Issue 4, pp 68:1-68:11, (2010).

[28] SAVIOJA, L, "Real-Time 3D Finite-Difference Time-Domain Simulation of Mid-Frequency Room Acoustics," 13th International Conference on Digital Audio Effects, DAFx-10, (2010).

[29] SCHISSLER, et al., "Gsound: Interactive sound propagation for games," AES 41st International Conference: Audio for Games, (2011).

[30] SILTANEN, et al., "The room acoustic rendering equation," The Journal of the Acoustical Society of America, Volume 122, Issue 3 (September), pp 1624-1635, (2007).

[31] SILTANEN, et al., "Geometry reduction in room acoustics modeling," Acta Acustica united with Acustica, Volume 94, Issue 3, pp 410-418, (2008).

[32] SVENSSON, et al., "An analytic secondary source model of edge diffraction impulse responses," Acoustical Society of America Journal, Volume 106 (November), pp 2331-2344, (1999).

[33] TAYLOR, et al., "Resound: interactive sound rendering for dynamic virtual environments," MM '09: Proceedings of the seventeen ACM international conference on Multimedia, ACM, pp 271-280, (2009).

[34] TAYLOR, et al., "Guided multiview ray tracing for fast auralization," IEEE Transactions on Visualization and Computer Graphics, Volume 18, pp 1797-1810, (2012).

[35] THOMPSON, L. L., "A review of finite-element methods for time-harmonic acoustics," Journal of the Acoustical Society of America, Volume 119, Issue 3, pp 1315-1330, (2006).

[36] TSINGOS, et al., "Modeling acoustics in virtual environments using the uniform theory of diffraction," SIGGRAPH 2001, Computer Graphics Proceedings, pp 545-552, (2001).

[37] TSINGOS, et al., "Perceptual audio rendering of complex virtual environments," Tech. Rep. RR-4734, INRIA, REVES/INRIA Sophia-Antipolis, February 2003

[38] TSINGOS, et al., "Instant sound scattering," Proceedings of the Eurographics Symposium on Rendering, pp 111-120, (2007).

[39] TSINGOS, et al., "Pre-computing geometry-based reverberation effects for games," 35th AES Conference on Audio for Games, (2009).

[40] VORLANDER, M, "Simulation of the transient and steady-state sound propagation in rooms using a new combined ray-tracing/image-source algorithm," The Journal of the Acoustical Society of America, Volume 86, Issue 1, pp 172-178, (1989).

[41] WAND, M, et al., "Multi-resolution sound rendering," SPBG '04 Symposium on Point-Based Graphics 2004, pp 3-11, (2004).

[42] YEH, et al., "Wave-ray coupling for interactive sound propagation in large complex scenes," ACM Transactions on Graphics, Volume 32, Issue 6, pp 165:1-165:11, (2013).

[43] ANTANI, et al., "Aural proxies and directionally-varying reverberation for interactive sound propagation in virtual environments," Visualization and Computer Graphics, IEEE Transactions, Volume 19, Issue 4, pp 218-233, (2013). [44] BORISH, J., "Extension to the image model to arbitrary poly-hedra," The Journal of the Acoustical Society of America, Volume 75, Issue 6 (June), pp 1827-1836, (1984).

[45] DROSS, et al., "A fast reverberation estimator for virtual environments," Audio Engineering Society Conference: $30^{th}$

[46] KUTTRUFF, H., "A simple iteration scheme for the computation of decay constants in enclosures with diffusely reflecting boundaries," The Journal of the Acoustical Society of America, Volume 98, Issue 1, pp 288-293, (1995).

[47] NOORUDDIN, el at., "Simplification and repair of polygonal models using volumetric techniques," Visualization and Computer Graphics, IEEE Transactions, Volume 9, Issue 2, pp 191-205, (2003).

[48] SCHROEDER, M. R., "Natural sounding artificial reverberation," Journal of the Audio Engineering Society, Volume 10, Issue 3, pp 19-223, (1962).

What is claimed is:

1. A method for simulating sound propagation, the method comprising:

decomposing a virtual environment scene including at least one object into a plurality of surface regions, wherein each of the surface regions includes a plurality of surface patches, wherein the surface patches are subdivisions of the plurality of surface regions of the decomposed virtual environment scene;

organizing diffuse reflection sound rays generated by a virtual sound source in the virtual environment scene into a plurality of path tracing groups, wherein each of the path tracing groups comprises a group of the diffuse reflection sound rays that traverses a same sequence of surface patches within the virtual environment scene to a listener position, wherein the group of the diffuse reflection sound rays comprises at least one ray that traverses the same sequence of surface patches during a current time frame segment of an acoustic sound simulation for the virtual environment scene and at least one ray that traverses the same sequence of surface patches for a previous time frame segment;

determining, for each of the path tracing groups, a total sound intensity by combining a sound intensity computed for a current time with one or more previously computed sound intensities respectively associated with previous times; and generating a simulated output sound at the listener position using the determined sound intensities.

2. The method of claim 1 further comprising determining, for each of the path tracing groups, a sound delay by combining a sound delay computed for the current time with one or more previously computed sound delays respectively associated with the previous times.

3. The method of claim 2 wherein the combination of the one or more previously computed sound intensities and the one or more previously computed sound delays each comprise a moving average.

4. The method of claim 1 wherein the determined sound intensity for each of the path tracing groups is respectively stored as an entry of a hash table cache.

5. The method of claim 4 wherein each entry of the hash table cache is periodically updated.

6. The method of claim 1 comprising computing a preprocessed edge visibility graph for each edge of the at least one object included in the virtual environment scene.

7. The method of claim 6 wherein the preprocessed edge visibility graph is computed irrespective of the location of the sound source and the location of a listening entity.

8. The method of claim 1 comprising generating one or more meshes that correspond to different simulation wavelengths and reduce the number of diffraction edges of the at least object in the virtual environment scene.

9. The method of claim 8 comprising:
computing a surface voxelization for each of the one or more meshes;
simplifying a shape of each of the one or more meshes by conducting a surface decimation operation to progressively merge vertices in the one or more meshes that share a diffraction edge into a single vertex; and
computing, for each of the one or more meshes, an edge visibility graph that includes a set of candidate diffraction edges from the simplified mesh, wherein the candidate diffraction edges significantly deviate from being planar.

10. A system for simulating sound propagation using wave-ray coupling, the system comprising:
a processor;
a scene decomposition module (SDM) executable by the processor, the SDM is configured to decompose a virtual environment scene including at least one object into a plurality of surface regions, wherein each of the surface regions includes a plurality of surface patches, wherein the surface patches are subdivisions of the plurality of surface regions of the decomposed virtual environment scene; and
a sound propagation tracing (SPT) module executable by the processor, the SPT module is configured to:
organize diffuse reflection sound rays generated by a virtual sound source in the virtual environment scene into a plurality of path tracing groups, wherein each of the path tracing groups comprises a group of the diffuse reflection sound rays that traverses a same sequence of surface patches within the virtual environment scene to a listener position, wherein the group of the diffuse reflection sound rays comprises at least one ray that traverses the same sequence of surface patches during a current time frame segment of an acoustic sound simulation for the virtual environment scene and at least one ray that traverses the same sequence of surface patches for a previous time frame segment;

determine, for each of the path tracing groups, a sound intensity by combining a total sound intensity computed for a current time with one or more previously computed sound intensities respectively associated with previous times; and generate a simulated output sound at the listener position using the determined sound intensities.

11. The system of claim 10 wherein the SPT module is further configured to determine, for each of the path tracing groups, a sound delay by combining a sound delay computed for the current time with one or more previously computed sound delays respectively associated with previous times.

12. The system of claim 11 wherein the one or more previously computed sound intensities and the one or more previously computed sound delays each comprise a moving average.

13. The system of claim 10 wherein the sound intensity for each of the path tracing groups is respectively stored as an entry of a hash table cache.

14. The system of claim 13 wherein each entry of the hash table cache is periodically updated by the SPT module.

15. The system of claim 10 comprising a high-order edge diffraction (HED) module configured to compute a preprocessed edge visibility graph for each edge of the at least one object included in the virtual environment scene.

16. The system of claim 15 wherein the visibility graph is computed irrespective of the location of the sound source and the location of a listening entity.

17. The system of claim 10 comprising an edge diffraction simplification (EDS) module configured to generate one or more meshes that correspond to different simulation wavelengths and reduce the number of diffraction edges of the at least object in the virtual environment scene.

18. The system of claim 17 wherein the EDS module is further configured to:
compute a surface voxelization for each of the one or more meshes;
simplify a shape of each of the one or more meshes by conducting a surface decimation operation to progressively merge vertices in the one or more meshes that share a diffraction edge into a single vertex; and
compute, for each of the one or more meshes, an edge visibility graph that includes a set of candidate diffraction edges from the simplified mesh, wherein the candidate diffraction edges significantly deviate from being planar.

19. A non-transitory computer readable medium having stored thereon executable instructions that when executed by a processor of a computer control the computer to perform steps comprising:
decomposing a virtual environment scene including at least one object into a plurality of surface regions, wherein each of the surface regions includes a plurality of surface patches, wherein the surface patches are subdivisions of the plurality of surface regions of the decomposed virtual environment scene;
organizing diffuse reflection sound rays generated by a virtual sound source in the virtual environment scene into a plurality of path tracing groups, wherein each of the path tracing groups comprises a group of the diffuse reflection sound rays that traverses a same sequence of surface patches within the virtual environment scene to a listener position, wherein the group of the diffuse reflection sound rays comprises at least one ray that traverses the same sequence of surface patches during a current time frame segment of an acoustic sound simulation for the virtual environment scene and at least one ray that traverses the same sequence of surface patches for a previous time frame segment;

determining, for each of the path tracing groups, a total sound intensity by combining a sound intensity computed for a current time with one or more previously computed sound intensities respectively associated with previous times; and generating a simulated output sound at the listener position using the determined sound intensities.

20. The non-transitory computer readable medium of claim 19 further comprising determining, for each of the path tracing groups, a sound delay by combining a sound delay computed for the current time with one or more previously computed sound delays respectively associated with the previous times.

21. The non-transitory computer readable medium of claim 20 wherein the combination of the one or more previously computed sound intensities and the one or more previously computed sound delays each comprise a moving average.

22. The non-transitory computer readable medium of claim 19 wherein the determined sound intensity for each of the path tracing groups is respectively stored as an entry of a hash table cache.

23. The non-transitory computer readable medium of claim 22 wherein each entry of the hash table cache is periodically updated.

24. The non-transitory computer readable medium of claim 19 comprising computing a preprocessed edge visibility graph for each edge of the at least one object included in the virtual environment scene.

25. The non-transitory computer readable medium of claim 24 wherein the preprocessed edge visibility graph is computed irrespective of the location of the sound source and the location of a listening entity.

26. The non-transitory computer readable medium of claim 19 comprising generating one or more meshes that correspond to different simulation wavelengths and reduce the number of diffraction edges of the at least object in the virtual environment scene.

27. The non-transitory computer readable medium of claim 26 comprising:

computing a surface voxelization for each of the one or more meshes;

simplifying a shape of each of the one or more meshes by conducting a surface decimation operation to progressively merge vertices in the one or more meshes that share a diffraction edge into a single vertex; and computing, for each of the one or more meshes, an edge visibility graph that includes a set of candidate diffraction edges from the simplified mesh, wherein the candidate diffraction edges significantly deviate from being planar.

* * * * *